United States Patent [19]

Shiba et al.

[11] Patent Number: 4,866,469
[45] Date of Patent: Sep. 12, 1989

[54] PHOTOSENSITIVE MATERIAL PACKAGE UNIT PROVIDED WITH EXPOSURE FUNCTION

[75] Inventors: Keisuke Shiba; Hisashi Shiraishi, both of Kanagawa, Japan

[73] Assignee: Fuji Photo Film Co., Ltd., Kanagawa, Japan

[21] Appl. No.: 153,892

[22] Filed: Feb. 9, 1988

[30] Foreign Application Priority Data

Feb. 9, 1987 [JP] Japan .................................. 62-27651

[51] Int. Cl.$^4$ ...................... G03B 17/02; G03B 17/28
[52] U.S. Cl. ..................... 354/202; 354/212; 354/288; 430/961
[58] Field of Search ............... 354/202, 212, 275, 288, 354/214; 352/130; 430/961

[56] References Cited

U.S. PATENT DOCUMENTS

| Re. 32,514 | 10/1987 | Steklenski | 430/961 |
|---|---|---|---|
| 1,377,727 | 5/1921 | Power | 352/130 |
| 2,012,334 | 8/1935 | Barenyi | 354/212 |
| 2,153,665 | 4/1939 | Goldhammer | 354/212 |
| 3,625,692 | 12/1971 | Meyer et al. | 430/961 |
| 3,998,989 | 12/1976 | Pardee et al. | 430/961 |
| 4,004,927 | 1/1977 | Yamamoto et al. | 96/67 |
| 4,047,958 | 9/1977 | Yoneyama et al. | 96/87 R |
| 4,190,449 | 2/1980 | Naoi et al. | 430/961 |
| 4,275,146 | 6/1981 | Yoneyama et al. | 430/523 |
| 4,440,483 | 4/1984 | Linke et al. | 354/288 |
| 4,455,074 | 6/1984 | Wong et al. | 354/214 |

Primary Examiner—A. A. Mathews
Attorney, Agent, or Firm—Sughrue, Mion, Zinn, Macpeak & Seas

[57] ABSTRACT

A photosensitive material package unit provided with an exposure function that has been preloaded with a photosensitive material having on a support a photographic layer having at least one silver halide emulsion layer and a back layer on the side opposite to the photographic layer is provided. In the photosensitive material package unit, (1) a package unit main body base has (a) a first holding chamber for holding an unexposed photosensitive material with the unexposed photosensitive matrial rolled directly therein or with the unexposed photosensitive material rolled and contained in a container and (b) a second holding chamber for holding an exposed photosensitive material with the exposed photosensitive material rolled directly therein or with the exposed photosensitive material rolled and contained in a container, (2) at least one of the unexposed photosensitive material and the exposed photosensitive material is held in the holding chamber or the container with the photosensitive material rolled and loosened and in contact with the holding chamber or the container, and (3) a coefficient of friction between the photographic layer and the back layer of the photosensitive material is 0.35 or less.

6 Claims, 4 Drawing Sheets

PHOTOSENSITIVE MATERIAL PACKAGE UNIT PROVIDED WITH EXPOSURE FUNCTION

FIELD OF THE INVENTION

The present invention relates to photosensitive material package units provided with an exposure function that are easy to handle, and compact and can give excellent photographic pictures.

BACKGROUND OF THE INVENTION

Although a camera and a photographic film are needed to take photographs, it is cumbersome to carry a camera all the time. Therefore, it is convenient if a film unit having a lens that has a photographing function and a photographic film built therein can be purchased with ease like purchasing common photographic film. In view of this, the present applicant has suggested a film unit with a lens that uses as film a 110 film cartridge. Using the film unit with a lens, the user can take photographs with a conventional camera. In addition, although the film unit with a lens does not have such features as an openable rear cover for allowing a film to be loaded and unloaded, a film rewinding mechanism, a sophisticated exposure control mechanism, etc., the film unit can be provided at very low cost so that one can advantageously and with ease enjoy photographing. After photographing, it is only required that the main unit body itself be brought to a shop that takes care of the development; therefore, subsequent handling is quite simple.

The photographic film used in the conventional film unit having a lens is a strip of 110 film loaded together with leader paper in a cartridge. Therefore, when the film unit with a lens is assembled, the exposure aperture on the cartridge side is just pushed to an exposure frame in the main unit body, thereby enabling assembling to be done efficiently. Further, if the cartridge is to be removed from the main unit body before development processing, since the film is contained in the cartridge with the film shielded from light, there is no possibility of fogging.

Since photographic films used in conventional film units with a lens are built in a cartridge form with 110 film, it has not been necessary to adjust the physical properties of such films.

Means of obtaining excellent images are disclosed, for example, in Kokai Giho, Vol. 11-39, No. 861-11650.

SUMMARY OF THE INVENTION

In order to provide a film with a lens which takes photographs with excellent image quality, if a film unit with a lens is constructed with a large picture size (such as the popular 135 film size in a container, hereafter a "patrone"), a problem due to difference in cartridge structure arises. For instance, when the film unit with a lens is assembled, a technique can be used where the patrone is present on the side of the main body base having therein a photographic lens, a shutter, etc., the leading end of the film is anchored to a winding shaft and a back plate is put on the main body base. In this case, when photography is completed, since the film has been pulled completely out from the patrone, it is necessary to rewind the exposed film into the patrone before development processing. The user thus has to rewind the film, which spoils the ease of use of the film unit with a lens and makes the film unit equivalent to camera. On the other hand, if such film units are taken into a development laboratory, every film has to be rewound into the patrone in the development laboratory, and a special rewinding machine is needed, which is disadvantageous in view of cost and time.

Therefore, a technique has been developed where an unexposed film is used in such a state that the film is first drawn out from the patrone when the film is inserted in the main body base of the unit, and every time a photograph is taken, the exposed film is wound into the patrone. According to this technique, since all the film will be finally contained in the patrone when photography is completed, the above disadvantage can be obviated.

However, when such an approach is adapted, it has been found that the feed resistance that occurs when the unexposed film is wound up is great.

The present invention provides a package unit comprising a film unit with a lens where the film used is roll film contained in a patrone and the film can be easily wound.

For that purpose, the main body base having a photographic lens and a shutter therein is formed with a container holding chamber for holding a film container, such as a patrone, and another chamber for holding a container for containing a film, preferably for holding directly a film, which is drawn out from the film container and is rolled optionally using or not using a winding shaft, with loosening of the rolled film being supresed. Alternatively, the main body base is founded with the container holding chamber and another container holding chamber for holding a film container having such a film precontained therein. The film employed in this film unit with a lens has a special physical property.

Package units of a film with a lens that have the above construction are shown in FIGS. 1 to 3 as a specific example.

A film of a photographic material is rolled and is held in such a package unit 1 with the film in direct contact with a film roll chamber 11 in a main body base 2 so that the film will not be unrolled. A back plate 3 is mounted to make the unit 1 light-tight. The main body base 2 thereby provides a lens to the film. A release button 6 (FIG. 3) is pushed for exposure. A film winding knob 8 is operated to move a sprocket 16 and thereby the film 21 is slid between a film support surface 15 of the main body base 2 and a film surface regulating surface 30 of the back plate 3 to be housed in a patrone 20. With respect to the package unit 1, the running property of the film can be improved for example by curving the film surface regulating surface 30 toward the outside of the back plate 3.

As another embodiment shown in FIG. 4, a package unit has a first holding chamber wherein a film container is held. This package unit is the same as the embodiment of FIGS. 1 to 3 except that the film roll chamber 11 is replaced by a container holding chamber 11' which holds a film container having a precontained film.

However, if a usual type of film employed, several difficulties may arise in the course of drawing the roll film out from the film roll chamber or a film container holding chamber for the roll of the film may collapse to hamper the drawing operation. The perforations and the sprocket may be mismatched. The film may be broken, The photosensitive surface of the film may disengage from the film support surface 15 thereby making the image forming surface unstable.

In the package unit of the present invention, the photosensitive material that has not been exposed is different from that of the known photographic procedures using usual cameras. Additionally, the unexposed photosensitive material is not precontained in a cartridge or the like but is rolled using or not using a roll core and is held in a holding chamber that is part of the package unit, the held unexposed photosensitive material roll being in contact with the wall. The unexposed photosensitive material preferably is rolled without a roll core. This state is hereinafter referred to free roll state.

The properties required for the photosensitive material in the stage during which the photosensitive material rolled in such a manner is wound successively into a winding container after the photographic operation are greatly different from those required in the conventional cases using a patrone or a cartridge. In the conventional type of photography using in a camera, photosensitive materials packaged in conventional manner, the resistance that is encountered when the photosensitive material after photography is wound is mainly that caused when the photosensitive material is drawn out from a container such as a patrone. However, in the present packaging method of directly holding a photosensitive material and in the photography using the package unit of the present invention, such parts are not involved. In the packaging material of the present invention, it is desirable to make as far as possible the material itself compact and to make the volume of the two holding chambers smaller. Therefore, in such a packaging material, the photosensitive material is rolled in a free roll state with the roll diameter made smaller almost all the time. Then, when the photosensitive material is wound in after photography, the rubbing of the surface and the undersurface of successive winds against each other cannot be eliminated.

Further, in the case where a photosensitive material is previously held in a container, a winding mechanism for winding a photographically exposed photosensitive material that can be provided economically in the package unit of the present invention cannot be made as mechanically precise as in the case of the conventional cameras. Therefore, the winding force is not strong and it cannot be helped that the operational precision is low.

Therefore, the photosensitive material to be packaged by the packaging material of the present invention is required to have a property different form that of the conventional photosensitive materials. That is, the frictional resistance between one surface and the other surface of the photosensitive material to be packaged in the packaging material of the present invention, particularly in the free roll state, is required to be low.

An object of the present invention is to provide a photosensitive material that is used together with a photosensitive material package unit provided with an exposure device and that has a property that allows smooth winding after the photographic exposure.

Another object of the present invention is to provide a so-called film package unit with a lens wherein a film of a photosensitive material is rolled without a cartridge, is held in a patrone chamber directly or with the film contained in a container and will be wound directly into the other patrone chamber or a patrone after the photographic exposure.

Another object of the present invention is to provide a so-called film package unit with a lens that has a film of a photosensitive material held therein that can be run smoothly and can be wound easily.

Other objects can be understood from the following description.

The inventors have achieved the above objects by providing a photosensitive material package unit provided with an exposure function that has been preloaded with a photosensitive material having on a support a photographic layer having at least one silver halide emulsion layer and a back layer on the side opposite to the photographic layer. The package unit is characterized in that:

(1) a package unit main body has (a) a first holding chamber for holding an unexposed photosensitive material with the unexposed photosensitive material rolled directly therein or with the unexposed photosensitive material rolled and contained in a container and (b) a second holding chamber for holding an exposed photosensitive material with the exposed photosensitive material rolled directly therein or with the exposed photosensitive material rolled and contained in a container, (2) either the unexposed photosensitive material or the exposed photosensitive material or both are held in the holding chamber or the container with the photosensitive material rolled and loosened and in contact with the holding chamber or the container, and (3) the coefficient of friction between the photographic layer and the back layer of the photosensitive material is 0.35 or less.

To give the required property to a silver halide photosensitive material, means of lowering the sliding frictional resistance is applied to one surface and/or the other surface of the material. As such means can be mentioned, for example, a method wherein a special substance improves the slip property and a method wherein the surface is roughened by using a particulate substance. Any means can be used if the coefficient of friction between the surfaces becomes 0.35 or less.

DETAILED DESCRIPTION OF THE INVENTION

Figure 1:
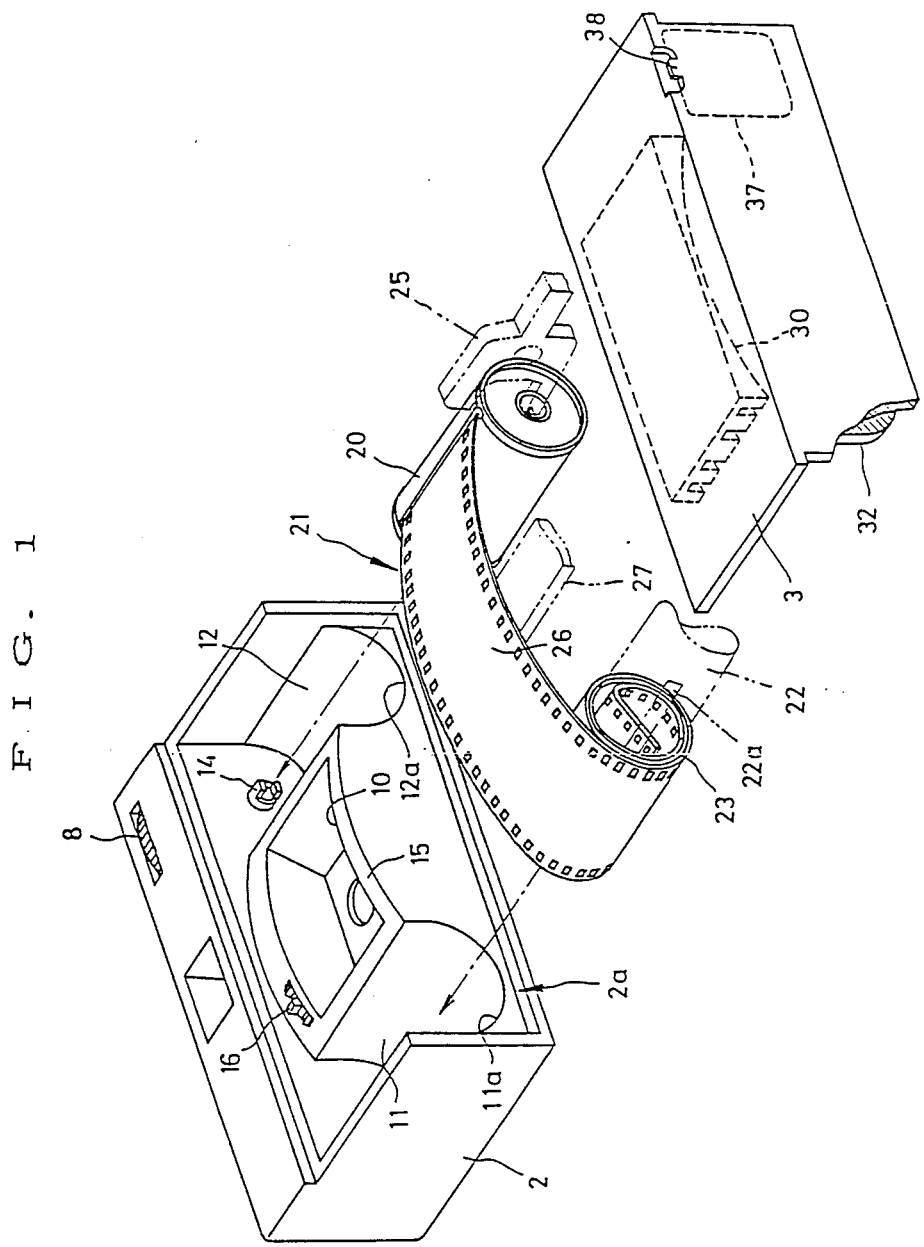
FIG. 1 is an exploded perspective view of first embodiment of the photosensitive package unit of the present invention.
Figure 2:
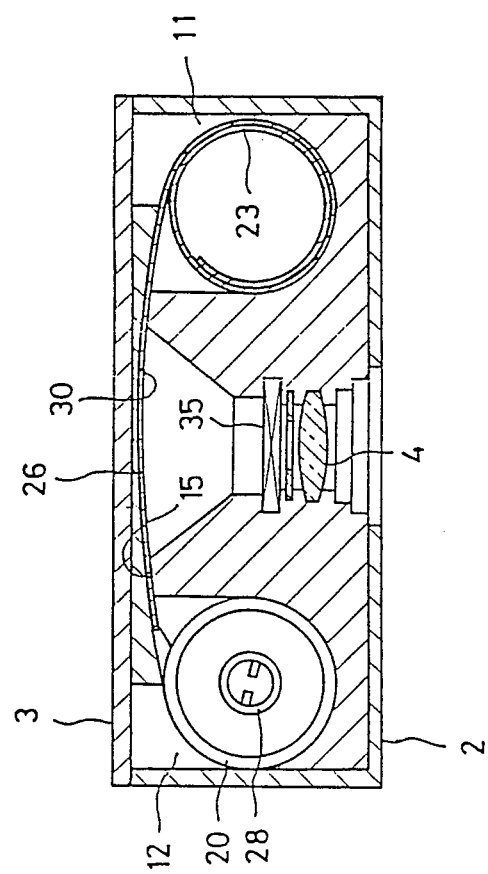
FIG. 2 is a cross sectional view of the essential parts of the photosensitive package unit of FIG. 1.
Figure 3:
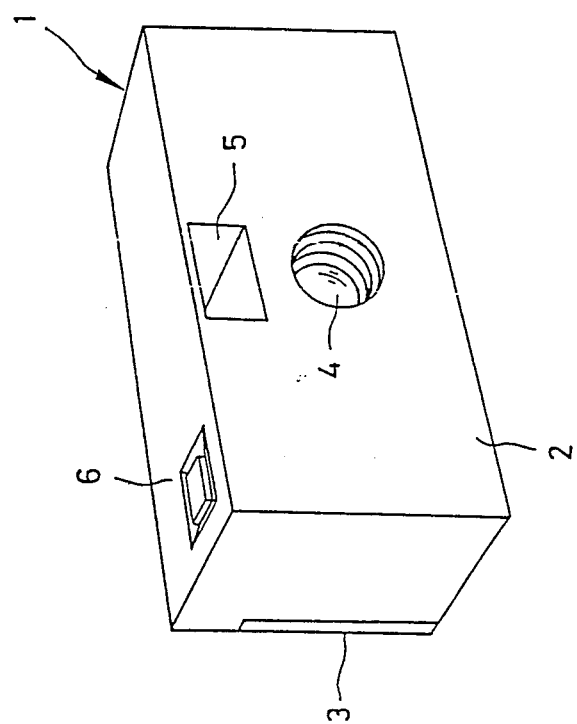
FIG. 3 is a view showing an outer appearance of the photosensitive package unit of FIG. 1.

As substances for improving slip property that are to be present on the photosensitive material surface used in the present invention, the following can preferably be used: for example, organic silicon compounds represented by polydimethylsiloxanes as described in U.S. Pat. Nos. 3,042,522, 3,080,317, 4,004,927, and 4,047,958, higher fatty acids and their salts as described in U.S. Pat. No. 2,976,148, higher fatty acid amides described in U.S. Pat. Nos. 2,732,305, and 4,275,146, higher fatty acid esters and higher aliphatic alcohol esters as described, for example, in U.S. Pat. No. 3,121,060, and Japanese Patent Publication Nos. 46258/74, 40664/75, 9057/82 and 33541/83, and paraffins and waxes as described in U.S. Pat. Nos. 3,786,002 and 9,779,771. Organic silicon compounds, higher fatty acid esters or higher aliphatic alcohol esters are particularly preferable.

Examples of preferable compounds used in the present invention are compounds represented by the general formula (I), (II), (III), (IV), (V), or (VI) given below:

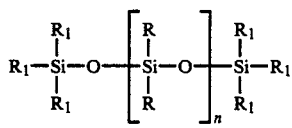
(I)

The R groups which may be the same or different, represents an alkyl group having 5 to 20 carbon atoms, a cycloalkyl group having 5 to 20 carbon atoms, an alkoxyalkyl group having 5 to 20 carbon atoms, an arylalkyl group having 5 to 20 carbon atoms, an aryloxyalkyl group having 5 to 20 carbon atoms, or a 2,3-epoxypropyloxyalkyl group having 5 to 20 carbon atoms.

The $R_1$ groups, which may be the same or different, represents an alkyl group having 1 to 20 carbon atoms, a cycloalkyl group having 5 to 20 carbon atoms, an alkoxyalkyl group having 5 to 20 carbon atoms, an arylalkyl group having 5 to 20 carbon atoms, an aryloxyalkyl group having 5 to 20 carbon atoms, or a 2,3-epoxypropyloxyalkyl group having 5 to 20 carbon atoms, and n is a number of from 0 to 2000.

Effective silicone polymers include, for example, commercially available silicone oils such as trialkyl and trialkoxy terminal blocked dialkylpolysiloxanes such as dimethylpolysiloxane, diethylpolysiloxane, trimethoxy terminal blocked dimethylpolysiloxanes, and triethoxy terminal blocked dimethylpolysiloxanes. These silicone compounds have a number average molecular weight of 162 to 150,000, preferably 10,000 to 20,000, and a viscosity of 2 to 100,000 cSt, preferably 200 to 800 cSt at 25° C.

Typical examples of compounds represented by general formula (I) are given below:

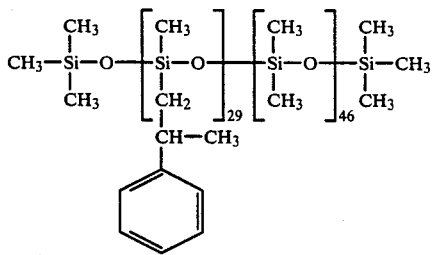
(I-1)

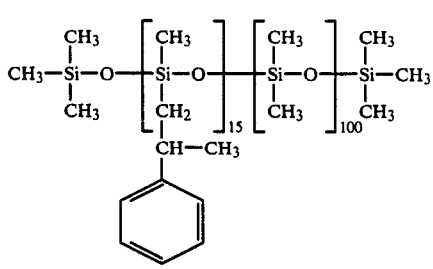
(I-2)

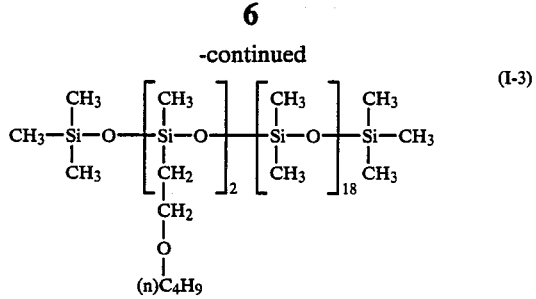
(I-3)

Polydimethylsiloxane (I-4)

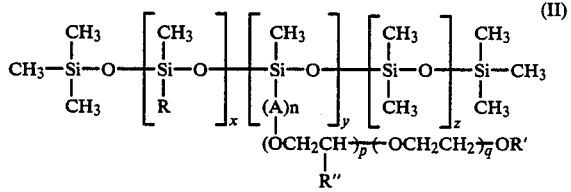
(II)

wherein

R represents an aliphatic group having 1 to 20 carbon atoms or an aryl group having 6 to 20 carbon atoms, R' represents a hydrogen atom, an aliphatic group having 1 to 20 carbon atoms, or an aryl group having 6 to 20 carbon atoms.

R" represents an alkyl group having 1 to 20 carbon atoms, or an alkoxyalkyl group having 1 to 20 carbon atoms, A represents a divalent aliphatic hydrocarbon residue having 1 to 20 carbon atoms, n is 0 or an integer number of from 1 to 12,
p is a number of from 0 to 5,
q is a number of from 2 to 50,
x is a number of from 0 to 100,
y is a number of from 1 to 50, and
z is a number of from 0 to 100, provided that x+y+z is a number of from 5 to 250.

Examples of compounds represented by general formulae (II), (II-1) and (II-2) are given below:

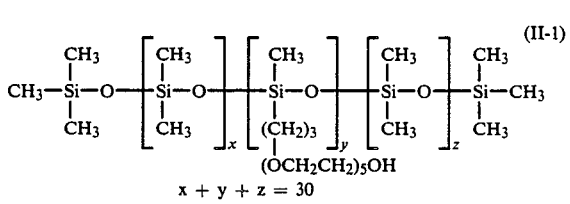
(II-1)

x + y + z = 30

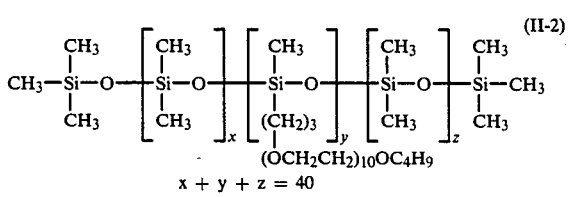
(II-2)

x + y + z = 40

(III)

wherein $R_1$ represents a hydrocarbon group having at least one double bond and containing 18 to 23 carbon atoms, preferably 21 to 23 carbon atoms and $R_2$ and $R_3$ each represents a hydrogen atom or a lower alkyl group having 1 to 4 carbon atoms.

The hydrocarbon group represented by $R_1$ may be straight or branched, although preference is given to a straight hydrocarbon group. Examples of $R_1$ are $C_{21}H_{41}$ and $C_{23}H_{41}$ and examples of $R_2$ and $R_3$ are $CH_3$, $C_2H_5$, $C_3H_6$ and $C_4H_9$.

Specific examples of typical compounds represented by general formula (III) are given below.

| | |
|---|---|
| erucic acid amide | (III-1) |
| erucic acid-N—methylamide | (III-2) |
| erucic acid-N—ethylamide | (III-3) |
| selacholeic acid-N—methylamide | (III-4) |
| selacholeic acid-N,N—diethylamide | (III-5) |

$$\begin{array}{l} CH_2OCCOR_1 \\ | \\ CHOCOR_2 \\ | \\ CH_2OCOR_3 \end{array} \quad (IV)$$

wherein $R_1$, $R_2$ and $R_3$, which may be the same or different, each represents an alkyl group having 10 to 20 carbon atoms.

Specific examples of compounds represented by general formula (IV) are given below:

$$\begin{array}{l} CH_2OCOC_{10}H_{21}(n) \\ | \\ CHOCOC_{10}H_{21}(n) \\ | \\ CH_2OCOC_{10}H_{21}(n) \end{array} \quad (IV-1)$$

$$\begin{array}{l} CH_2OCOC_{11}H_{23}(n) \\ | \\ CHOCOC_{11}H_{23}(n) \\ | \\ CH_2OCOC_{11}H_{23}(n) \end{array} \quad (IV-2)$$

$$\begin{array}{l} CH_2OCOC_{15}H_{31}(n) \\ | \\ CHOCOC_{15}H_{31}(n) \\ | \\ CH_2OCOC_{15}H_{31}(n) \end{array} \quad (IV-3)$$

$$R_7COOR_8 \quad (V)$$

wherein $R_7$ and $R_8$, which may be the same or different, each represents an alkyl group having 10 to 20 carbon atoms.

Specific examples of compounds represented by general formula (V) are given below:

| | |
|---|---|
| $(n)C_{13}H_{27}COOC_{16}H_{33}(n)$ | (V-1) |
| $(n)C_{15}H_{31}COOC_{16}H_{33}(n)$ | (V-2) |
| $(n)C_{13}H_{27}COOC_{20}H_{41}(n)$ | (V-3) |
| $(n)C_{15}H_{31}COOC_{20}H_{41}(n)$ | (V-4) |

$$\begin{array}{l} CH_2OR_1 \\ | \\ R_4OCH_2-C-CH_2OR_2 \\ | \\ CH_2OR_3 \end{array} \quad (VI)$$

wherein $R_1$, $R_2$, $R_3$ and $R_4$ each represents a hydrogen atom or an aliphatic carboxylic acid residue having 12 to 24 carbon atoms, provided that at least three of $R_1$, $R_2$, $R_3$ and $R_4$ represent aliphatic carboxylic acid residues having 12 to 24 carbon atoms.

Specific examples of compounds represented by general formula (VI) are given below:

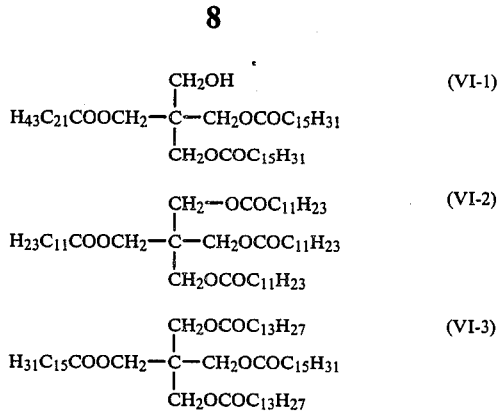

These compounds can be used alone or in combination. To improve the dispersibility of these compounds or to make application easy, other additives can be added and it is preferable to add additives according to the individual system. Selection of these additives will be easily made based on the knowledge possessed by those skilled in the art.

The photosensitive material used in the present invention has at least a photographic layer on one side of a support and a non-photographic layer that is generally called a back layer on the opposite side.

To provide the property desired in the present invention by using the above compound(s), it is preferable to add the compound to a surface layer on the side of the photosensitive layer and/or a surface layer on the side of the back layer. Generally, a surface layer on the side of the photosensitive layer is made of a hydrophilic colloid liquid such as gelatin or the like and is called a protective layer. The back layer may be one using, as a binder, a hydrophilic colloid such as gelatin or one containing a hydrophobic binder such as cellulose diacetrate. A layer containing the compound(s) according to the invention may be placed on the protective layer and/or the back layer.

In the practice of the invention, the compound(s) according to the invention is added to the photographic surface layer coating liquid such as the hydrophilic colloid liquid for a protective layer or the like or to various coating liquid for a back layer in such a manner that a coating amount of the compound(s) according to the invention is, through depending upon the characteristics required of the photosensitive material, is 2 g/m² to 0.005 g/m², preferably 1 g/m² to 0.01 g/m² and the thus prepared liquid is applied at a thickness of 5 μ to 0.01 μ, preferably 1 μ to 0.1 μ, overcoated onto or impregnated into the protective layer, preferably impregnated therein. That is, the compound according to the invention is added as an aqueous dispersion prepared in the presence of a dispersant such as an anionic, nonionic wetting agent or a polymer latex, etc. to a hydrophilic colloid coating liquid, or is added to the coating liquid in the presence of a dispersant directly, or if desired, after being diluted with an organic solvent dissolving the compound. For an organic solvent type coating liquid for the back layer, the compound(s) according to the invention may be dissolved in an organic solvent and added to the coating liquid. The coating liquid to which the compound(s) according to the invention has been added can be applied or allowed to premeate by a dipping method as described, for example, in U.S. Pat. No. 3,335,026 or by a spraying method as described, for example, in U.S. Pat. No. 2,674,167.

When these compounds are used in the protective layer, it is preferable to use them with a hydrophilic colloid, for example, gelatin, colloidal albumin, casein, cellulose derivatives such as carboxymethylcellulose, and hydroxyethylcellulose, agar-agar, sodium alginate, sugar derivatives such as starch derivatives, synthetic hydrophilic colloids such as polyvinyl alcohol, poly-N-vinylpyrrolidone, polyacrylic acid copolymers, polyacrylamide or derivatives and partial hydrolysates thereof. If necessary, two or more compatible mixtures of these colloids are used.

Of these, gelatin is most preferably used.

Preferable binders that can be used together with the compound(s) and are capable of forming a coating when the compound(s) is applied to a support back surface include cellulose esters such as cellulose triacetate, cellulose diacetate, cellulose acetate maleate, cellulose acetate phthalate, hydroxyalkylalkylcellulose phthalate (the alkyl group having 1 to 4 carbon atoms), hydroxyalkylalkylcellulose tetrahydrophthalate, (the alkyl group having 1 to 4 carbon atoms); polycondensate polymers such as a polycondensate of formaldehyde with cresol or salisylic acid with oxyphenylacetic acid or a polycondensate or terephthalic acid or isophthalic acid with polyalkylene glycol (dimer, trimer or tetramer of ethylene glycol or propylene glycol); homopolymers of acrylic acid, methacrylic acid, styrene carboxylic acid or styrene sulfonic acid or copolymers of these monomers or maleic anhydride with a styrene derivative, alkyl alkylates (the alkyl group having 1 to 4 carbon atoms), alkyl methacrylate (the alkylkyl group having 1 to 4 carbon atoms), vinyl chloride, vinyl acetate, alkyl vinyl ethers (the alkyl group having 1 to 4 carbon atoms) or an acrylonitrile or a ring-opened half ester or half amide thereof or partially hydrolyzed polyvinyl acetate; and synthetic polymers such as homopolymers or copolymers prepared from monomers having a polymerizable unsaturated bond such as polyvinyl alcohol.

When a binder is used, water, organic solvents or mixtures of these can be used as a solvent. The above-mentioned organic solvents and these organic solvents include, for example, alcohols such as methanol, ethanol, and butanol, acetone, ketones such as methyl ethyl ketone, halogenated hydrocarbons such as chloroform, methylene chloride, and carbon tetrachloride, ethers such as diethyl ether, dioxane, and tetrahydrofuran, aromatic hydrocarbons such as benzene, toluene, and xylene, alicyclic hydrocarbons such as cyclohexane and cyclopentane and aliphatic hydrocarbons such as n-hexane and n-octane.

The amount of these compounds to be added is 0.1 to 20%, preferably 1 to 10%, based on the total weight of the binder so that the coefficient of friction between the photographic layer and the back layer of the photosensitive material becomes 0.35 or less.

Preferably, the amount of these compounds to be coated on the photographic layer and the back layer is 1 to 0.01 g/m$^2$.

To roughen the surface of the photosensitive material, finely divided particles having a particle size of 0.1 to 50 $\mu$, preferably 0.5 to 20 $\mu$ (hereinafter referred to as a matting agent) described, for example, in U.S. Pat. No. 3,849,191, British Pat. No. 1,293,189, Japanese patent application (OPI) Nos. 188942/85 and 28476 (the term "OPI" as used herein refers to a "published unexamined Japanese patent application) can be used.

Specific examples of matting agents include, as organic compounds, preferably, water-dispersible vinyl polymers such as polymethyl methacrylate, cellulose acetate propionate and starch, etc., and, as inorganic compounds, preferably, carbon powder, silver halide, barium strontium sulfate, calcium carbonate, silicon dioxide, magnesium oxide, titanium oxide, etc. Particularly, spherical matting agents or homopolymers or acrylates such as methyl methacrylate, glycidyl acrylate had glycidyl methacrylate or water-dispersible vinyl copolymers such as copolymers of these acrylates or of these acrylates with other vinyl monomers.

Although particulate carbon or graphite is used only for the back layer because of their light shielding property, they are very effective.

The amount of the matting agents to be added is 0.01 to 1 g, preferably 0.1 to 0.5 g, per 1 m$^2$ of the photosensitive material.

Not only can these matting agents be used together with the above-mentioned substances for improving slip property, but it is also known that their combination exhibits a synergistic effect.

To obtain the effect of the present invention, it is more effective to apply the above-mentioned means to both sides of the photosensitive material. However, it is also effective to apply the above-mentioned means only to one side to obtain the effect of the present invention so lone as the coefficient of friction between the surfaces of the photosensitive material is 0.10 to 0.35. Preferably, the coefficient of friction is 0.30 or less. The degree of the slip property of the surfaces can be determined by measuring the coefficient of friction against a steel ball that is generally used; it is more preferable that the coefficient of friction measured by this method is 0.35 or less and the coefficient of friction between the surfaces is 0.35 or less.

The important aspect of the invention is not to improve the slip property of each of the surfaces of the photosensitive material but to lower the friction resistance when the photosensitive material is rolled in the free roll state, that is, the frictional resistance of the combination of the surface/undersurface of the photosensitive material. When the frictional resistance of the combination of the surface/undersurface of the photosensitive material is lowered, the photosensitive material can be wound smoothly and precisely by a weak winding force from a container or a first holding chamber where the photosensitive material is rolled in the free roll state or is rolled around a shaft into a container such as a patrone in a second holding chamber.

In the present invention, the coefficient of friction was measured by the following method.

Method of Measuring the Coefficient of Dynamic Friction between the Surface and the Undersurface of the Photosensitive Material A sample was adhered to a stainless steel plate with the surface protective layer exterior the plate, and a load of 100 g was applied to it to serve as a pressing fixed terminal. Another sample was prepared and was fixed to a horizontally movable sample table with the surface opposite to the protective layer upside. The pressing fixed terminal to which a load cell was attached was placed thereon, and the horizontal resistance force was measured by moving the sample table horizontally 10 $\mu$m at a rate of 1 m/min. The coefficient of friction was determined by dividing the resistance force by the load of 100 g.

The coefficient of friction of each surface of the photosensitive material was measured by the conventional method as follows.

Method of Measuring the Coefficient of Dynamic Friction of Each Surface of the Photosensitive Material A 5-mm$\phi$ steel ball to which a load of 100 g was applied was placed on a surface to be measured, and the horizontal resistance force was measured by moving horizontally the sample to be measured at a distance of 10 $\mu$m at a rate of 1 m/min. The coefficient of friction was determined by dividing the horizontal resistance by the load of 100 g.

The photosensitive material used in the present invention includes black-and-white photosensitive materials and color photosensitive materials. The layers and the materials used will now be described.

Silver halide grains in the photographic emulsions used in the photosensitive materials of the present invention can be grains having a grain size of 0.01 $\mu$ to 5 $\mu$, preferably 0.2 $\mu$ to 2 $\mu$ (grains having a grain size of 0.2 $\mu$ to 2 $\mu$ may be mixed with grains having a grain size of less than 0.2 $\mu$) and having a regular crystal form such as a cubic form, a octahedral form, a rhombododecahedral form, or a tetradecahedral form, or an irregular crystal form such as a spherical form or a tabular form, or a composite form of these. Further, tabular grains having an aspect ratio of 5 or more as described in *Research Disclosure*, Vol. 225, pages 20 to 58 (January, 1983) can also be used.

Grains having an epitaxial structure may be used, and grains having a multilayer structure wherein the composition (e.g., the halogen composition) of the surface of the grains is different from that of the inside of the grains are preferable.

The grain size distribution may be polydisperse or monodisperse, and it is preferable to use a monodisperse emulsion having a dispersion coefficient of 20% or below, more preferably 15% or below (the dispersion coefficient is obtained by dividing the standard deviation by the average grain size).

The photographic emulsions used in the present invention may be prepared by methods as described, for example, by P. Glafkides, in "Chimie et Physique Photographique", Paul Montae (1967), by G. F. Duffin in "Photographic Emulsion Chemistry", The Focal Press (1966), and by V. L. Zelikman et al. in "Making and Coating Photographic Emulsions", the Focal Press (1964). The silver halide grains may be any combination of silver bromide, silver chlorobromide, and silver chloride that contains 30 mol% or less, preferably 25 to 2 mol % of silver iodide. Silver bromoiodide grains are preferable.

In the process of formation or physical ripening of the silver halide grains, for example, a cadmium salt, a zinc salt, a lead salt, a thallium salt, an iridium salt or its complex salts, a rhodium salt or its complex salts, or an iron salt or its complex salts may also be present.

The photosensitive material of the present invention may contain, in the photographic layer, organic or inorganic fine particles that will be used in the protective layer and the back layer as a matting agent such as alkylacrylate type latexes as described, for example, in U.S. Pat. Nos. 3,411,911 and 3,411,912 and Japanese Patent Publication No. 5331/70.

It is preferable that the silver halide emulsion used in the photosensitive silver halide emulsion layer of the present invention be chemically sensitized.

That is, sulfur sensitization that uses a compound containing sulfur capable of reacting with a silver ion or active gelatin, reduction sensitization that uses a reducible substance, and noble metal sensitization that uses gold or other noble metal compound, etc., may be used alone or in combination. As a sulfur sensitizer, use can be made of thiosulfates, thioureas, thiazoles, rhodanines, and other compounds. As a reduction sensitizer, used can be made of stannous salts, amines, hydrazine derivatives, formamidinesulfinic acid, silane compounds, etc. As a noble metal sensitizer, use can be made of gold complex salts, and complex salts of metals of Group VIII of the Periodic Table of the Elements such as complex salts of platinum, iridium and palladium.

The photosensitive material of the present invention may contain, as a stabilizer, various compounds known as stabilizers, for example, azoles such as benzothiazolium salts, nitroindazoles, triazoles, benzotriazoles, benzimidazoles (particularly nitro- or halogen-substituted compounds); heterocyclic mercapto compounds such as mercaptothiazoles, mercaptobenzothiazoles, mercaptobenzimidazoles, mercaptothiadiazoles, mercaptotetrazoles (particularly 1-phenyl-5-mercaptotetrazole), and mercaptopyridines; heterocyclic mercapto compounds having a water-soluble group such as a carboxyl group or a sulfonic group; thioketo compounds such as oxazolinethion; azaindenes such as tetraazaindenes (particularly 4-hydroxy-substituted (1,3,3a,7) tetraazaindenes); benzenethiosulfonic acids; and benzenesulfinic acid.

In the photographic silver halide emulsion layers or other layers of the photosensitive material of the present invention, use can be made of surface active agents that can serve, for example, as a coating assistant, an antistatic agent, an emulsifier and an adhesion preventive agent, and can also improve the slip property.

Examples of the surface active agents are saponins (steroid type), nonionic surface active agents such as alkylene oxide derivatives (e.g., polyethylene glycol, polyethylene glycol/polypropylene glycol condensates, polyethylene glycol alkyl ethers or polyethylene glycol alkylaryl ethers, polyethylene glycol esters, polyethylene glycol sorbitan esters, polyalkylene glycol alkylamides or amides and polyethylene oxide adducts of silcones), glycidol derivatives (e.g., alkenyl succinic acid polyglycerides, and alkylphenolpolyglycerides), polyvalent alcohol fatty acid esters, and alkyl esters of sugars; anionic surface active agents having an acid group such as a carboxyl group, a sulfo group, a phospho group, a sulfate group, and a phosphate group such as alkyl carboxylates, alkyl sulfonates, alkylbenzene sulfonates, alkylnaphthalene sulfonates, alkyl sulfates, alkyl phosphates, N-acyl-N-alkyltaurine acid, sulfosuccinic acid esters, sulfoalkyl polyoxyethylenealkylphenyl ethers, and polyoxyethylenealkyl phosphates; amphoteric surface active agents such as amino acids, aminoalkyl sulfonates, aminoalkyl sulfates or phosphates, alkyl betaines, and amine oxides; and cationic surface active agents such as alkyl amine salts, aliphatic or aromatic quaternary ammonium salts, heterocyclic quaternary ammonium salts of pyridinium or imidazolium and aliphatic or heterocyclic phosphonium or sulfonium salts.

The amount of the surface active agent to be used in the present invention is 0.01 to 5% by weight based on the weight of photographic silver halide emulsion layers or other layers of the photosensitive material of the present invention.

The photographic silver halide emulsion layer(s) of the present invention or at least one other layer of the photographic material obtained by using the emulsion layer(s) can also contain, as an antistatic agent, a low molecular or high-molecular fluorine containing compound.

Examples of low-molecular fluorine compounds are described, for example, in U.S. Pat. Nos. 3,775,126, 3,589,906, 3,798,265, 3,779,768, and 4,407,937, West German Pat. No. 1,293,189, British Pat. No. 1,259,398, British patent application Nos. 58,431, 1,330,356, and 1,417,915, Japanese patent application (OPI) Nos. 87826/73, 10722/74, 46733/74, 16525/75, 113221/75, 161236/75, 99525/75, 7917/76, 32322/76, 106419/76, 151124/76, 151125/76, 151126/76, 151127/76, 129229/76, 127974/77, 84712/78, 146622/78, 14224/79, 48520/79, 7762/80, 114944/81, 16233/83, and 23344/84, Japanese Patent Publication Nos. 43130/73 and 16073/77, *Research Disclosures* 16630 (February, 1978), 17341 (September, 1978) and 17611 (December, 1978).

Examples of high-molecular fluorine compounds are described, for example, in U.S. Pat. Nos. 4,175,969, 4,087,394, 4,016,125, 3,676,123, 3,679,411, and 4,304,852, Japanese patent application (OPI) Nos. 129520/77, 158222/79, 57842/80, 11342/82, 19735/82 and 179837/82, "Kagaku Soran No. 27, New Fluorine Chemistry" (edited by Nihon Kagakukai, 1980) and "Functional Fluorine-containing Polymers (Konohsei Ganfusso Kobunshi)" by Satokawa (Nikkan Kogyo Shinbunsha, 1982).

The silver halide photographic emulsions can be spectrally sensitized with methine dyes, etc. The dyes that can be used include cyanine dyes, merocyanine dyes, composite cyanine dyes, composite merocyanine dyes, holopolar cyanine dyes, hemicyanine dyes, styryl dyes and hemioxonol dyes. Particularly useful dyes are dyes belonging to cyanine dyes, merocyanine dyes and composite merocyanine dyes. Any nucleus generally used in cyanine dyes can be used as a basic heterocyclic nucleus in these dyes. That is, a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nucleus, etc.; nuclei formed by fusing an alicyclic hydrocarbon ring to these nuclei; and nuclei formed by fusing an aromatic hydrocarbon ring to these nuclei; i.e., an indolenine nucleus, a benzindolenine nucleus, an indole nucleus, a benzoxazole nucleus, a naphthoxazole nucleus, a benzothiazole nucleus, a benzimidazole nucleus, a quinoline nucleus, etc. can be used. These nuclei may have substituents on a carbon atom thereof.

The amount of the sensitizing dye to be used in the present invention is preferably $1 \times 10^{-6}$ to $5 \times 10^{-3}$ mol per mol of silver.

In a black-and-white photosensitive material, generally an antihalation layer is placed on the support, one or more silver halide photosensitive layers are placed on a subbing layer, and the protective layer according to the present invention is placed, or a back layer is placed on the surface opposite thereto. Dyes and colloidal silver are generally used in the antihalation layer or in the back layer.

A color photosensitive material generally has a blue sensitive silver halide photosensitive layer unit containing a yellow coupler, a green sensitive silver halide photosensitive layer unit containing a magenta coupler, a red sensitive silver halide photosensitive layer unit containing a cyan coupler, a photosensitive silver halide functional layer for making or donating an inter layer effect, an inter image effect, etc., in which a DIR coupler or DAR (development accelerator releasing) coupler is contained, an intermediate layer, a filter layer, etc., and a protective layer and a back layer according to the invention.

In the present invention, various color couplers can be used, and examples thereof are described in patents cited in *Research Disclosure*, RD No. 17643, VII-C-G.

The amount of the color couplers to be used in the present invention, though depending upon the function of the color couplers, generally ranges from 0.001 g to 10 g, preferably 0.01 g to 5 g per m$^2$ of the color photographic material.

It is preferable to use as yellow couplers those described, for example, in U.S. Pat. Nos. 3,933,501, 4,022,620, 4,326,024, and 4,401,752, Japanese Patent Publication No. 10739/83, British Pat. Nos. 1,425,020 and 1,476,760, etc.

It is preferable to use, as magenta couplers, 5-pyrazolone type and pyrazoloazole type compounds and it is particularly preferable to use those described, for example, in U.S. Pat. Nos. 4,310,619 and 4,351,897, European Pat. No. 73,636, U.S. Pat. Nos. 3,061,432 and 3,725,067, *Research Disclosure*, RD No. 24220 (June, 1984), Japanese patent application (OPI) No. 33552/85, *Research Disclosure*, RD No. 24230 (June, 1984), Japanese patent application (OPI) No. 43659, and U.S. Pat. Nos. 4,550,630 and 4,540,654.

As cyan couplers, there can be mentioned phenol type and naphthol type couplers, and it is preferable to use those described, for example, in U.S. Pat. Nos. 4,042,212, 4,146,396, 4,228,233, 4,296,200, 2,369,929, 2,801,171, 2,772,162, 2,895,826, 3,772,002, 3,758,308, 4,334,011 and 4,327,173, West German patent application (OLS) No. 3,329,729, European Pat. No. 121,365A, U.S. Pat. Nos. 3,446,622, 4,333,999, 4,451,559 and 4,427,767 and European Pat. No. 161,626A.

Preferable colored couplers for correcting the undesired absorption of the formed color dye are those described, for example, in *Research Disclosure*, RD No. 17643, VII-G, U.S. Pat. No. 4,163,670, Japanese Patent Publication No. 39413/82, U.S. Pat. Nos. 4,004,929 and 4,138,258, and British Pat. No. 1,146,368.

As couplers whose formed color dye has suitable diffusibility, there are preferably used those described, for example, in U.S. Pat. No. 4,366,237, British Pat. No. 2,125,570, European Pat. No. 96,570 and West German patent application (OLS) No. 3,234,533.

Typical examples of polymerized dye forming couplers are described, for example, in U.S. Pat. Nos. 3,451,820, 3,080,211 and 4,367,282, and British Pat. No. 2,102,173.

Couplers that release a photographically useful residue upon coupling can also preferably be used in the invention. DIR couplers that release a development inhibitor are preferably those described, for example, in patents cited in above *Research Disclosure*, RD No. 17643, VII-F (December, 1978), Japanese patent application (OPI) Nos. 151944/82, 1542334/82 and 184248/85 and U.S. Pat. No. 4,248,962.

Couplers that imagewise release a nucleator or a development accelerator are preferably those described, for example, in British Pat. Nos. 2,097,140 and 2,131,188, and Japanese patent application (OPI) Nos. 157638/84 and 170840/84.

Further, as couplers that can be used in the photosensitive material of the present invention, there can be mentioned, for example, competing couplers described, for example, in U.S. Pat. No. 4,130,427, multi-equivalent couplers described, for example, in U.S. Pat. Nos. 4,283,472, 4,388,393 and 4,310,618, DIR redox compound releasing couplers described, for example, in Japanese patent application (OPI) No. 185950/85 and couplers described in European Pat. No. 173,302A that release a dye capable restoring color after releasing.

Couplers used in the present invention can be introduced into the photosensitive material by various known dispersing methods.

Examples of high-boiling solvents used in the oil-in-water dispersion method are described, for example, in U.S. Pat.. No. 2,322,027.

Steps and effects of the latex dispersing method, and specific examples of latexes for impregnation are described, for example, in U.S. Pat. No. 4,199,363, and West German patent application (OLS) Nos. 2,541,274 and 2,541,230.

Known photographic additives that can be used in the present invention are described in the above-mentioned two Research Disclosures, and the related sections describing them are listed in the following table.

1. Color development-bleaching-(washing)-fixing-(washing)-(stabilizing)
2. Color development-bleaching/fixing (blix)-(washing)-(stabilizing)
3. Color development-bleaching-bleaching-bleaching/fixing (blix)-(washing)-(stabilizing)
4. Color development-bleaching-bleaching/fixing (blix)-(washing)-(stabilizing)
5. Color development-bleaching-fixing-bleaching-/fixing (blix)-(washing)-(stabilizing)
6. Black-and-white development-washing-reversing-color development-(adjustment)-bleaching-fixing-(washing)-(stabilizing)
7. Black-and-white development -washing-(reversing)-color development-(adjustment)-bleaching/fixing (blix)-(washing)-(stabilizing)
8. Black-and-white development-washing-(reversing)-color development-(adjustment)-bleaching-bleaching/fixing (blix)-(washing)-(stabilizing)

Although steps in parentheses above can be omitted according to the procedure, the purpose and the use of the photosensitive material, washing and stabilizing cannot be simultaneously omitted.

The above processing baths will now be described.

Color Development

| No. | Kind of Additives | Reasearch Disclosure 17643 | Research Disclosure 18716 |
|-----|---|---|---|
| 1. | Chemical Sensitizers | Page 23 | Page 648, right column |
| 2. | Sensitivity Increasing Agents | | " |
| 3. | Spectral Sensitizers and supersensitizer | Pages 23 to 24 | Page 648, right column to page 649, right column |
| 4. | Whitening Agents | Page 24 | — |
| 5. | Antifoggants and Stabilizers | Page 24 to 25 | Page 649, right column |
| 6. | Light-Absorbers Filter Dyes and Ultraviolet Ray Absorbers | Page 25 to 26 | Page 649, right column to page 650, left column |
| 7. | Antistaining Agents | Page 25, right column | Page 650, left column to right column |
| 8. | Dye Image Stabilizers | Page 25 | — |
| 9. | Hardeners | Page 26 | Page 651, left column |
| 10. | Binders | Page 26 | " |
| 11. | Plasticizers and Lubricants | page 27 | Page 650, right column |
| 12. | Coating Aids and Surfactants | Page 26 to 27 | " |
| 13. | Antistatic Agents | Page 27 | " |

Supports that can be used in the present invention are described, for example, in *Research Disclosure*, No. 17643, page 28 (December, 1978) and *Research Disclosure*, RD No. 18716, page 647, right column, to page 648, left column (November, 1979).

A black-and-white photosensitive material according to the invention can be processed by using a conventional black-and-white developing solutions and a conventional fixing solutions.

In the black-and-white developing solutions, use can be made of known developing agents such as dihydroxybenzenes (e.g., hydroquinone), 3-pyrazolidones (e.g., 1-phenyl-3-pyrazolidone), and aminophenols (e.g., N-methyl-p-aminophenol), and for example, D-76, etc., can be used alone or in combination. The pH is preferably 8.0 to 10.5.

Although a color photosensitive material according to the invention can be subjected to conventional color development processing, in particular the following color development processing steps can be used.

The color developing solution used in the development processing of the photosensitive material of the present invention is preferably an aqueous alkaline solution whose major component is an aromatic primary amine type color developing agent. Although an aminophenol type compound as the color development agent is useful, p-phenylene-diamine diamine type compounds are preferably used, and as typical examples thereof can be mentioned 3-methyl-4-amino-N,N-diethylaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-N-β-methoxyethylaniline and their sulfates, hydrochlorides, phosphates, p-toluene sulfonate, tetraphenyl borate, and p-(t-octyl)benzenesulfonate. These diamines are generally more stable in the state of the salt than in the free state, and the salts of the diamines are preferable.

The aminophenol type derivatives include, for example, o-aminophenol, p-aminophenol, 4-amino-2-methylphenol, 2-amino-3-methylphenol, and 3-oxy-3-amino-1,4-dimethylbenzene.

Further, those described in "Photographic Processing Chemistry", by L. F. A. Mason, Focal Press, pages 226 to 229, U.S. Pat. Nos. 2,193,015 and 2,592,364, Japanese patent application (OPI) No. 64933/73, etc. may be used. If required, two or more color developing agents may be combined to be used.

The color developing solution may contain pH buffers such as carbonates, borates or phosphates of alkali metals; antifoggants or development inhibitors such as mercapto compounds, benzothiazoles, benzimidazoles, iodides and bromides; preservatives such as sulfites, bisulfites, compounds described in West German patent application (OLS) No. 2,622,950, triethanolamine and hydroxylamine; organic solvents; development accelerators such as 3,6-thiaoctane-1,8-diol, thiocyanates, amines, quaternary ammonium salts, polyethylene glycol and benzyl alcohol; dye-forming couplers; competing couplers; nucleators such as sodium boron halides; auxiliary developing agents such as 1-phenyl-3-pyrazolidone and thickening agents; and chelate agents such as aminopolycarboxylic acids, for example, ethylenediaminetetraacetic acid, nitrilotriacetic acid, cyclohexadiaminetetraacetic acid, iminodiacetic acid, N-hydroxymethylethylenediaminetriacetic acid, diethylenetriaminepentaacetic acid, triethylenetetraminehexaacetic acid, and compounds as described in Japanese patent application (OPI) No. 195845/83, 1-hydroxyethylidene-1,1'-diphosphonic acid, organic phosphonic acids as described in Research Disclosure, RD No. 18170 (May, 1979), aminophosphonic acids such as aminotris(-methylenephosphonic acid) and ethylenediamine-N,N,N',N'-tetramethylenephosphonic acid and phosphonocarboxylic acids as described in Japanese patent application (OPI) Nos. 102726/77, 42730/78, 121127/79, 4024/89, 4025/80, 126241/80, 65955/80 and 65946/80, and Research Disclosure, RD No. 18170 (May, 1979).

The color developing agent is generally used in a concentration of about 0.1 to about 30 g per liter of the color developing solution, preferably about 1 to about 15 g per liter of the color developing solution. The pH of the color developing solution is generally 7 or more and more generally about 9 to 13. For the color developing solution, a replenishing solution where the concentrations of the halides, the color developing agent, etc., have been adjusted can be used to lower the replenishing amount.

The processing temperature of the color developing solution of the present invention is preferably 20° to 50° C., more preferably 30° to 40° C. The processing time is 20 seconds to 10 minutes, preferably 30 seconds to 5 minutes.

Bleaching Solution, Bleach/Fix Solution and Fixing Solution

As a bleaching agent in a bleaching solution or a bleach-fix solution used in the present invention there can be used ferric complex salts that are complexes of a ferric ion with aminopolycarboxylic acids or aminopolyphosphonic acids or chelate agents such as their salts, Aminopolycarboxylates or aminopolyphosphonates are salts of alkali metals, ammonium or water-soluble amines with aminopolycarboxylic acids or aminopolyphosphonic acids. Alkali metals include sodium, potassium, lithium, etc. and water-soluble amines include alkylamines such as methylamine, diethylamine, triethylamine, and butylamine, alicyclic amines such as cyclohexylamines, arylamines such as m-toluidine and aniline, and heterocyclic amines such as pyridine, morpholine and piperidine.

Typical examples of chelate agents such as these aminopolycarboxylic acids and aminopolyphosphonic acids and their salts are given below, but the invention is not limited to these exemplified compounds:
ethylenediaminetetraacetic acid,
disodium ethylenediaminetetraacetate,
diammonium ethylenediaminetetraacetate,
tetra(trimethylammonium) ethylenediaminetetraacetate,
tetrapotassium ethylenediaminetetraacetate,
tetrasodium ethylenediaminetetraacetate,
trisodium ethylenediaminetetraacetate,
diethylenetriaminepentaacetic acid,
pentasodium diethylenetriaminepentaacetate,
ethylenediamine-N-($\beta$-oxyethyl)-N,N',N'-triacetic acid,
trisodium ethylenediamine-N-($\beta$-oxyethyl)-N,N',N'-triacetate,
triammonium ethylenediamine-N-($\beta$-oxyethyl)-N,N',N'-triacetate,
1,2-diaminopropanetetraacetic acid,
disodium 1,2-diaminopropanetetraacetate,
1,3-diaminopropanetetraacetic acid,
diammonium 1,3-diaminopropanetetraacetic acid,
nitrilotriacetic acid,
trisodium nitrilotriacetate,
cyclohexanediaminetetraacetic acid,
disodium cyclohexanediaminetetraacetate,
iminodiacetic acid,
dihydroxyethylglycine,
ethyl ether diaminetetraacetic acid,
glycol ether diaminetetraacetic acid,
ethylenediaminetetrapropionic acid,
phenylenediaminetetraacetic acid,
1,3-diaminopropanol-N,N,N',N'-tetramethylenephosphonic acid,
ethylenediamine-N,N,N',N'-tetramethylenephosphonic acid and
1,3-propylenediamine-N,N,N',N'-tetramethylenephosphonic acid.

Generally, of the above chelate agents, ethylenediaminetetraacetic acid, diethylenetriaminepentaacetic acid, cyclohexanediaminetetraacetic acid and 1,3-diaminopropanetetraacetic acid are preferable.

Ferric complex salts may be used in the form of a complex salt or a ferric salts such as ferric sulfate, ferric chloride, ferric nitrate, ammonium ferric sulfate, and a ferric phosphate and a chelate agent such as an aminopolycarboxylic acid, an aminopolyphosphonic acid and a phosphonocarboxylic acid may be used to form a ferric complex salt in solution. When complex salts are used, one of them or a combination of two or more of them can be used. When a ferric salt and a chelate agent are used to form a complex salt in solution, one or more ferric salts may be used. Further, one or more chelate agents may also be used. In either case, a chelate agent may be used in excess to form a ferric ion complex salt. Of iron complex salts, aminopolycarboxylic acid iron complex salts are preferable, and the amount to be added is 0.1 to 1 mol/l, preferably 0.2 to 0.4 mol/l, for a bleaching solution for photographing photosensitive materials such as negative color films, and 0.05 to 0.5 mol/l, preferably 0.1 to 0.3 mol/l, for a bleach/fix solution. In the case of a bleaching solution or a bleach/fix solution for color photosensitive materials such as color papers, the amount added is 0.03 to 0.3 mol/l, preferably 0.05 to 0.2 mol/l.

Further, if required, the bleaching solution or the bleach/fix solution may use a bleach accelerating agent. The amount of the bleach accelerating agent to be used is 0.1 to 10 mol/l, preferably 0.5 to 5 mol/l, for a bleaching solution or a bleach/fix solution. As specific examples of useful bleach accelerating agents, these can be mentioned compounds having a mercapto group or a disulfide group as described, for example, in U.S. Pat. No. 3,893,858, West German Pat. Nos. 1,290,812 and 2,059,988, Japanese patent application (OPI) Nos. 32736/78, 57831/78, 37418/78, 65732/78, 72623/78, 95630/78, 95631/78, 104232/78, 1244424/78, 141623/78 and 28426/78 and Research Disclosure, No. 17129 (July, 1978); thiazolidine derivatives as described in Japanese patent application (OPI) No. 140129/75; thiourea derivatives as described in Japanese Patent Publication No. 8506/70, Japanese patent application (OPI) Nos. 20832/77 and 32735/78 and U.S. Pat. No. 3,706,561; iodides as described in West German Pat. No. 1,127,715 and Japanese patent application (OPI) No. 16235/83; polyethylene oxides as described in West German Pat. Nos. 966,410 and 2,749,430; polyamine compounds as described in Japanese Patent Publication No. 8836/70; and iodine and bromine ions and compounds as described in Japanese patent application (OPI) Nos. 42434/74, 59644/74, 94927/78, 35727/79, 26506/80 and 163940/83. Of these, compounds having a mercapto group or a disulfide group are preferable in view of their high acceleration effect, and, in particular, compounds as described in U.S. Pat. No. 3,893,858, West German Pat. No. 1,290,812 and Japanese patent application (OPI) No. 95630/78 are preferable.

Further, to the bleaching solution or the bleach/fix solution used in the present invention, there can be added a rehalogenizing agent of the bromide (e.g., potassium bromide, sodium bromide and ammonium bromide), chloride (e.g., potassium chloride, solium chloride and ammonium chloride) or iodide (i.g., ammonium iodide) type. The amount of the rehalogenizing agents to be used in the present invention, though depending upon the kind of silver halide emulsions, generally is 2 to 0.1 mol/l, preferably 1 to 0.5 mol/l, for a bleaching solution or a bleach/fix solution. If desired, one or more inorganic acids, and organic acids that have a pH buffering function, and their alkali salts and ammonium salts such as boric acid, borax, sodium metaborate, acetic acid, sodium acetate, sodium carbonate, potassium carbonate, phosphorous acid, phosphoric acid, sodium phosphate, citric acid, sodium citrate, and tartaric acid and corrosion inhibitors such as guanidine and ammonium nitrate can be added.

In the fixing agent used in the bleach-fix solution or the fixing solution in the present invention, one can use known fixing agents such as thiosulfates, for example, sodium thiosulfate, and ammonium thiosulfate; thiocyanates, for example, sodium thiocyanate and ammonium thiocyanate; and water-soluble silver halide dissolving agents, such as thioureas and thioether compounds, for example, ethylenebisthioglycolic acid and 3,6-dithia-1,8-octanediol, which may be used in combination. Special bleach-fix solutions comprising a combination of a large amount of a halide such as potassium iodide with a fixing agent as described in Japanese patent application (OPI) No. 155354/76 can also be used. In the present invention, the use of thiosulfates and particularly ammonium thiosulfate is preferable.

Preferably the amount of the fixing agent used per liter is in the range of 0.3 to 2 mol, in particular in processing photographic color photosensitive materials the amount of the fixing agent used per liter is 0.8 to 1.5 mol, and in processing color photosensitive materials for prints the amount of the fixing agent used per liter is 0.5 to 1 mol.

Preferably, the pH range of the bleach/fix solution or the fixing solution in the present invention is 3 to 10, more preferably 5 to 9. When the pH is lower than that, though desilvering ability may be improved, deterioration of the solution and change of cyan dyes into leuco dyes are increased. By contrast, when the pH is higher than that, desilvering becomes slow, and stain is liable to occur.

To adjust the pH, for example, hydrochloric acid, sulfuric acid, nitric acid, acetic acid, a bicarbonate, ammonia, sodium hydroxide, potassium hydroxide, sodium carbonate or potassium carbonate can be added as required.

Further, the bleach/fix solution can contain various brightening agents, antifoamers, surface active agents, polyvinyl pyrrolidones and organic solvents such as methanol.

The bleach/fix solution or the fixing solution in the present invention can contain, as a preservative, a sulfite ion releasing compound such as a sulfite (e.g., sodium sulfite, potassium sulfite and ammonium sulfite), a bisulfite (e.g., ammonium bisulfite, sodium bisulfite and potassium bisulfite) and a metabisulfite (e.g., potassium metabisulfite, sodium metabisulfite and ammonium metabisulfite). Preferably, these compounds are contained in an amount of about 0.02 to 0.50 mol/l, more preferably 0.04 to 0.40 mol/l, in terms of sulfite ion.

Although, generally, as a preservative a sulfite is added, for example, ascorbic acid, a carbonyl bisulfite adduct or a carbonyl compound can be added.

Further, for example, a buffering agent, a brightening agent, a chelate agent and a mildew proofing agent can be added, if required.

The silver halide photographic material of the present invention is generally subjected to washing and/or stabilizing steps after desilvering processes such as the fixing and the bleach/fix steps.

The amount of washing water in the washing step can be set in a wide range depending on the application and the properties (for example, due to the material used such as the couplers) of the photosensitive material, the temperature of the washing water, the number of washing tanks (steps), the type of replenishing method such as a countercurrent method and a direct flow method, and other conditions. The relationship between the number of washing tanks and the amount of water in the multistage countercurrent method can be determined according to a method described in "Journal of the Society of Motion Picture and Television Engineers", Vol. 64, pages 248 to 253 (May, 1955).

According to the multistage countercurrent method described in the above publication, although the amount of washing water can be considerably decreased, and the replenishing amount per unit area of the photosensitive material is made, for example, to 1 to 50 times the amount introduced in from the preceding bath, bacteria propagate due to the increase of the dwell time of the water in the tanks, causing problems (for example, adhesion of resulting suspended matter on the photographic material). In the method of processing the color photographic material of the present invention, to solve such problems, a method of decreasing calcuim and magnesium up to 5 ppm respectively can be effectively used.

Further, isothiazolones as described in Japanese patent application (OPI) No. 8542/82 and bactericides such as thiazoylbendazoles, chlorine type bactericides such as sodium dichloroisocyanurate, benzotriazole, etc., as described in "Bokinbobaizai no Kagaku" by Hiroshi Horiguchi, "Biseibutsu no Mekkin, Sakkin, Bobai Gijutsu" edited by Eiseigijutsu-kai and "Bokinbobaizai Jiten" edited by Nihon Bokinbobai-gakkai can be used.

The pH of the washing water for processing the color photosensitive material of the present invention is 4 to 9, preferably 5 to 8. Although the temperature of the washing water and the period of washing are differently set according, for example, to the application and the properties of the photosensitive material, generally the temperature of the washing water and the period of washing are selected in the range of 15° to 45° C. for 20 seconds to 10 minutes, preferably 25° to 40° C. for 30 seconds to 5 minutes.

Further, the photosensitive material of the present invention can be processed by using, instead of the above washing water, a stabilizing solution directly. In such a process of stabilizing, all known methods described, for example, in Japanese patent application (OPI) Nos. 8543/82, 14834/83, 184343/84, 220345/85, 238832/85, 239784/85, 239749/85, 4054/86 and 118749/86 can be used.

Preferably, the stabilizing bath suitable for the color photosensitive material of the present invention is one containing 5-chloro-2-methyl-4-isothiazoline-3-one, surface active agents, formalin and chelate agents such as ethylenediaminetetraacetic acid, each in an amount of 0.0001 to 1 mol/l for the stabilizing bath.

It is widely known that these stabilizing processes are carried out after the washing process.

In some cases, the surface active agents used in the stabilizing bath will serve to evenly dry the photosensitive material and to facilitate washing away constituents in the photosensitive material. Preferably, these surface active agents are polyethylene glycol type nonionic surface active agents, phlydric alcohol type nonionic surface active agents and particularly alkylphenolethylene oxide adducts. Preferably the alkylphenols used are octyl, nonyl, dodecyl, and dinonylphenol, and the number of addition mols of the ethhylene oxide is preferably 8 to 14.

The stabilizing bath is adjusted to a pH of 3 to 8, and to adjust the pH, use can be made of alkali metal hydroxides such as sodium hydroxide and potassium hydroxide, ammonia, mineral acids such as sulfuric acid and hydrochloric acid, and organic acids such as acetic acid, tartaric acid and citric acid.

The photosensitive material used in the present invention can use all photographing silver halide photosensitive materials that use flexible supports. Black-and-white photosensitive materials and color photosensitive materials, particularly, color negative, color reversal, and high sensitivity color direct positive films are used. Conventional development processing methods and development processing methods that will be on the market from now on can be applied.

As shown in FIGS. 1 to 4, a package unit 1 of the invention comprises two principal external parts, a main body base 2 into an opening 2a of which is fitted and sealed a back plate 3. The main body base 2 includes a photographic lens 4, a viewfinder window 5 and a release buttom 6 for triggering the exposure. A film winding knob 8 is used to wind the film between exposures at an exposure frame 10.

Unexposed film 21 is preloaded as a rolled film in a film roll (first holding) chamber 11 having an opening 11a (or is precontained in a container held in a container holding chamber 11') and is wound after exposure into a patrone placed in a patrone (second holding) chamber 12 having an opening 12a. The patrone shaft 28 of the patrone 20 is engaged with a film winding form 14. The film engages the teeth of a sprocket 16 and is supported at the exposure frame 10 between a film support surface 15 of the main body base 2 and a similarly curved film regulating surface 30 of the back plate 3. The rolled film 23 is initially threaded through a slit 22a of a winding shaft 22 and supported at an extended film section 24 in the vicinity of the exposure frame 10 by a support plate 27 while the patrone is then supported by a gripping arm 25. After loading of the film, the back plate 3 is sealed to the main body based 2 with its step 32 matching the opening 11a of the film roll chamber 11. The patrone 20 of the assembled package unit 1 faces a breakout panel 37 with a tab 38.

The present invention is now explained with reference to the following examples, which are not intended to limit the invention. The percentages hereafter are by weight unless otherwise indicated.

EXAMPLE 1

An Embodiment of a Black-and-White Photosensitive Material Package Unit with a Lens (1) Preparation of a photosensitive silver halide emulsion (Emulsion A)

An aqueous potassium bromide solution, an aqueous potassium iodide solution and an aqueous silver nitrate solution were added to an aqueous inert gelatin solution with violent stirring to prepare thick tabular silver bromoiodide (AgI=8 mol %) having an average grain diameter of 1 $\mu$ and an average grain thickness of 0.16 $\mu$. The silver bromoiodide was then washed by a usual precipitation method, and was chemically sensitized by a gold/sulfur sensitizing method with chlorauric acid and sodium thiosulfate, and then, as a stabilizer, 4-hydroxy-6-methyl-1,3,3a,7-tetra-zaindene was added thereto to prepare photosensitive silver bromoiodide Emulsion A.

(Emulsion B)

In a similar manner as for Emulsion A, a thick tabular silver bromoiodide Emulsion B (AgI =6 mol %) having an average grain diameter of 0.5 $\mu$ was prepared.

(2) Preparation of a coating liquid containing a slipping agent for a Protective Layer First, an aqueous dispersion of a slipping agent was prepared as follows.

| Liquid C: | slipping agent | 2 g |
| | ethyl acetate | 1 g |
| Liquid D: | a 5% aqueous gelatin solution | 20 ml |
| | sodium triisopropylnaphthalene sulfonate | 2 g |
| Liquid E: | a 7% aqueous gelatin solution | 50 ml |

Liquids C and D were mixed and were emulsified under a pressure of 250 kg/m² using a valve-type homogenizer manufactured by Manton Ganlin Co., Ltd. to an O/W type dispersion. The particle diameter of the dispersion in the gelatin aqueous solution was controlled to be 0.8 $\mu$. Liquid E was added to the obtained dispersion, and water was added to make 80 ml to give slipping agent aqueous Dispersion (F).

An aqueous Dispersion (G) of a matting agent was prepared as follows.

10 ml of a 5% aqueous sodium dodecylbenzene sulfonate solution were added to 100 ml of a 10% aqueous gelatin solution, then 25 ml of a 5% polymethyl methacrylate solution in ethyl acetate were gradually added thereto while keeping the temperature at 45° C. and violently stirring, and the mixture was stirred violently for 10 minutes using a homogenizer to effect dispersing. After the completion of the dispersing, the ethyl acetate was distilled off by heating. The average particle diameter of the matting agent was 3.5 $\mu$.

The aqueous slipping agent Dispersion (F) and the matting agent Dispersion (G) were used to prepare Coating Liquid (H) for a surface protective layer as follows.

| | |
|---|---|
| 5% aqueous gelatin solution | 1000 ml |
| aqueous slipping agent Dispersion (F) | 70 ml |
| 5% aqueous sodium dodecylbenzene sulfonate solution | 20 ml |
| sodium p-styrene sulfonate | 0.5 g |
| aqueous matting agent Dispersion (G) | 60 ml |

The above liquids were successively mixed with stirring to give Liquid (H).

(3) Preparation of a Coating Liquid for the Back Layer

Coating Liquid (I) was prepared by dissolving and stirring the following composition:

| | |
|---|---|
| acetone | 700 ml |
| methanol | 200 ml |
| methylene chloride | 100 ml |
| cellulose diacetate | 4 g |
| slipping agent | 2 g |

Using 0.5 g of finely divided silicon oxide having an average particle diameter of 0.2 $\mu$ instead of the slipping agent in Liquid (I), Coating Liquid (J) was prepared.

Coating Liquid (K) for the back layer containing carbon black fine particles were prepared by dissolving and stirring the following composition:

| | |
|---|---|
| acetone | 600 ml |
| methyl cellosolve | 150 ml |
| methanol | 200 ml |
| hydroxypropylmethyl cellulose hexahydrophthalate | 20 g |
| carbon black (particle size: up to 0.1$\mu$ as an aggregated body) | 10 g |

(4) Application of the Back Layer

As shown in Table 1, Coating Liquids (I) and (J) for the back layer prepared in step (3) were applied on a triacetyl cellulose photographic film support and were dried at 90° C. for 3 minutes to form a back layer. In the case without the slipping agent, no slipping liquid was added to Liquid H. As Comparative Examples, Samples Nos. 7 and 8 using n-octyl phthalate (compound A) were prepared. The coating amount was such that the slipping agent was 200 mg/m².

(5) Preparation of Coated Samples

Each sample was prepared by successively placing the following layers on the undercoated triacetyl cellulose film support coated with the back layer as stated in step (4). The temperature for drying was about 60° to 75° C. A nonionic surface active agent W-1 having polyoxyethylene groups was added to the upper emulsion layer and the lower emulsion layer in amounts to correspond to the applied silver amounts.

W-1: $C_{18}H_{35}O(CH_2CH_2O)_{20}H$ (Lower Emulsion Layer)
Emulsion B was used.

| | |
|---|---|
| Binder: gelatin | 3.0 g/m² |
| Applied silver amount: | 2.0 g/m² |
| Sensitizing Dye: trimethinethiacarbocyanine type dye (3,3'-diethyl-9-methyl.thiacarbocyanine.p-toluenesulfonic acid) | 4.5 mg/m² |

(Upper Emulsion Layer)
Emulsion A was used.

| | |
|---|---|
| Binder: gelatin | 8.5 g/m² |
| Applied silver amount: | 5.0 g/m² |
| Sensitizing Dye: trimethinethiacarbocyanine type dye (3,3'-diethyl-9-methyl.thiacarbocyanine.p-toluenesulfonic acid) | 11.3 g/m² |
| Coating aid: sodium dodecylbenzene sulfonate | 0.1 mg/m² |
| potassium poly-p-styrene sulfonate | 1 mg/m² |

(Surface Protective Layer)

10 g of bisvinylsulfonylacetamidopropane as a hardening agent were added to coating Liquid (H) for the surface protective layer prepared in step (2) and Liquid (H) was applied so that the gelatin coating amount of the layer was 1 g/m².

The back layer and the protective layer were combined as shown in Table 1.

(6) Assessment of Coated Samples

After the application, the samples were kept at 25° C. and at a relative humidity of 65% for 7 days.

The coefficient of dynamic friction of the surface of each sample against a steel ball and the coefficient of sliding friction between the surface and the undersurface of each sample were measured. Each sample was loaded into a package unit in a manner as shown in FIG. 1, and the ease of the winding was assessed.

| | |
|---|---|
| Winding can be done lightly: | A |
| Winding can be done slightly heavily: | B |
| Winding can be done heavily: | C |
| Sometimes jamming occurred: | D |
| Winding resistance was great and the film was hardly moved: | E |

Each sample was assembled into a black-and-white film package unit with a lens as shown in FIG. 1 in such a manner that roll film (23) was contained in patrone 20 with the leading end of the sample being anchored to winding shaft 22 and the patrone was contained on the side of the main body base 2. The package unit was equipped with a single lens (F11 fixed focus) and a shutter of a fixed rate of (1/100 sec.). Persons, flowers and trees situated about 3.6 m away from the package unit were photographed in a room under a 40 W fluorescent light. After winding each sample, the package unit was broken to remove the patrone, and the sample was developed at 20° C. for 7 minutes with the following processing solution, and was then fixed, washed and dried.

| Developing Solution | | |
|---|---|---|
| Metal | 2 | g |
| Sodium sulfite | 100 | g |
| Hydroquinone | 5 | g |
| Borax.1OH$_2$O | 2 | g |
| Water to make | 1 | l |
| Fixing Solution | | |
| Sodium thiosulfate | 240 | g |
| Anhydrous sodium sulfite | 15 | g |
| Acetic acid (28%) | 48 | ml |
| Sodium metaborate | 15 | g |
| Potassium alum | 15 | g |
| Water to make | 1 | l |

TABLE 1

| Sample No. | Slipping Agent in back layer | Slipping Agent in protective layer | Coefficient of friction against steel ball Back layer | Coefficient of friction against steel ball Protective layer | Coefficient of friction of back layer/ protective layer | Winding property |
|---|---|---|---|---|---|---|
| 1-1 | without | without | 0.62 | 0.53 | 0.68 | E |
| 2 | " | I-1 | " | 0.25 | 0.40 | C |
| 3 | " | II-1 | " | 0.30 | 0.36 | C |
| 4 | " | III-1 | " | 0.40 | 0.45 | D |
| 5 | Liquid J | I-1 | 0.48 | 0.25 | 0.33 | B |
| 6 | " | III-1 | " | 0.41 | 0.43 | D |
| 7 | Compound A | I-4 | 0.55 | 0.26 | 0.35 | B |
| 8 | " | IV-1*[1] | " | 0.28 | 0.35 | B |
| 9 | " | III-1 | " | 0.40 | 0.45 | B |
| 10 | I-4 | I-1 | 0.25 | 0.26 | 0.25 | A |
| 11 | " | I-4 | " | 0.24 | 0.23 | A |
| 12 | " | IV-1*[1] | " | 0.28 | 0.24 | A |
| 13 | II-1 | I-1 | 0.36 | 0.26 | 0.25 | A |
| 14 | " | I-4 | " | 0.25 | 0.26 | A |
| 15 | II-1 | II-1 | 0.36 | 0.35 | 0.35 | B |
| 16 | " | IV-1*[1] | " | 0.29 | 0.31 | B |
| 17 | " | without | " | 0.52 | 0.43 | D |
| 18 | IV-1*[2] | I-4 | 0.30 | 0.26 | 0.25 | A |
| 19 | " | II-1 | " | 0.30 | 0.30 | A |
| 20 | " | IV-1*[1] | " | 0.28 | 0.26 | A |
| 21 | IV-1 | I-4 | 0.45 | 0.26 | 0.30 | A |
| 22 | " | I-4 | " | 0.25 | 0.31 | B |

*[1] The additive given in Example (1) of Japanese Patent Application (OPI) No. 90633/83 was used.
*[2] $C_{18}H_{37}N(CH_2CH_2OH)_2$ was additionally used as additive.

As is apparent from Table 1, in the combinations where a suitable sliding resistance lowering means was applied to one surface and/or the other surface of a photosensitive material and the coefficient of sliding friction of the surface/undersurface was 0.35 or below, problems such as poor winding did not occur in the package unit. Further, the photographed images obtained had an image quality equal to that of the images obtained in a conventional manner.

EXAMPLE 2

(1) Preparation of Samples

In the same way as for Example 1, an undercoated cellulose triacetate film support having a back layer was prepared. First to fifteenth layers having the compositions shown below were applied to the support to give color photosensitive materials.

(Photosensitive Layer Composition)

Each number corresponding to each component indicates the coating amount in g/m$^2$ and the amount of the silver halide is in terms of applied silver. With respect to the sensitizing dyes, the amount is given in mols for 1 mol of the silver halide in the same layer.

| First Layer (Antihalation layer) | |
|---|---|
| Black colloidal silver | |
| (particle size: up to 0.1μ) | 0.2 |
| Gelatin | 1.4 |
| UV-1 | 0.02 |
| UV-2 | 0.04 |
| UV-3 | 0.04 |
| Solv-1 | 0.05 |
| Second Layer (Intermediate layer) | |
| Fine particle silver bromide (average grain diameter: 0.07μ) | 0.08 |
| Gelatin | 1.1 |
| ExC-1 | 0.02 |
| ExM-1 | 0.06 |
| UV-1 | 0.03 |
| UV-2 | 0.06 |
| UV-3 | 0.07 |
| Cpd-1 | 0.1 |
| ExF-1 | 0.004 |
| Solv-1 | 0.1 |
| Solv-2 | 0.09 |
| Third Layer (Low-speed red sensitive layer) | |
| Silver bromoiodide emulsion (AgI: 6.3 mol %; inside higher AgI type; c/s ratio: 1/1; sphere equivalent diameter: 0.8μ; coefficient of variation of sphere equivalent diameter: 25%; tabular grains; diameter/thickness ratio: 2; applied silver amount: 1.5) | |
| Gelatin | 1.7 |
| ExC-2 | 0.3 |
| ExC-3 | 0.02 |
| ExS-1 | 7.1 × 10$^{-5}$ |
| ExS-2 | 1.9 × 10$^{-5}$ |
| ExS-3 | 2.4 × 10$^{-4}$ |
| ExS-4 | 4.2 × 10$^{-5}$ |
| Solv-2 | 0.03 |
| Fourth Layer (Intermediate-speed red sensitive emulsion layer) | |
| Silver bromoiodide emulsion (AgI: 4.8 mol %; inside higher AgI type; c/s | |

-continued ratio: ½; sphere equivalent diameter:
0.9μ; coefficient of variation of
sphere equivalent diameter: 50%; tabular
grains; diameter/thickness ratio: 1.5;
applied silver amount: 1.4)

| | |
|---|---|
| Gelatin | 2.1 |
| ExC-2 | 0.4 |
| ExC-3 | 0.002 |
| ExS-1 | $5.2 \times 10^{-5}$ |
| ExS-2 | $1.4 \times 10^{-5}$ |
| ExS-3 | $1.8 \times 10^{-4}$ |
| ExS-4 | $3.1 \times 10^{-5}$ |
| Solv-2 | 0.5 |

Fifth Layer (High-speed red sensitive emulsion layer)

Silver bromoiodide emulsion (AgI:
10.2 mol %; inside higher AgI type; c/s
ratio: ½; sphere equivalent diameter:
1.2μ; coefficient of variation of
sphere equivalent diameter: 35%; tabular
grains; diameter/thickness ratio: 3.5;
applied silver amount: 2.1)

| | |
|---|---|
| Gelatin | 2.0 |
| ExC-1 | 0.06 |
| ExC-4 | 0.04 |
| ExC-5 | 0.2 |
| ExS-1 | $6.5 \times 10^{-5}$ |
| ExS-2 | $1.7 \times 10^{-5}$ |
| ExS-3 | $2.2 \times 10^{-4}$ |
| ExS-4 | $3.8 \times 10^{-5}$ |
| Solv-1 | 0.1 |
| Solv-2 | 0.3 |

Sixth Layer (Intermediate layer)

| | |
|---|---|
| Gelatin | 1.1 |

Seventh Layer (Low-speed green sensitive emulsion layer)

Silver bromoiodide emulsion (AgI:
6.3 mol %; inside higher AgI type; c/s
ratio: 1/1; sphere equivalent diameter:
0.8μ; coefficient of variation of
sphere equivalent diameter: 25%; tabular
grains; diameter/thickness ratio: 2;
applied silver amount: 0.6)

| | |
|---|---|
| Gelatin | 0.8 |
| ExM-2 | 0.3 |
| ExM-1 | 0.03 |
| ExM-3 | 0.05 |
| ExY-1 | 0.04 |
| ExS-5 | $3.1 \times 10^{-5}$ |
| ExS-6 | $1.0 \times 10^{-4}$ |
| ExS-7 | $3.8 \times 10^{-4}$ |
| H-1 | 0.04 |
| H-2 | 0.01 |
| Solv-2 | 0.2 |

Eighth Layer (Intermediate-speed green sensitive emulsion layer)

Silver bromoiodide emulsion (AgI:
4.8 mol %; inside higher AgI type; c/s
ratio: ½; sphere equivalent diameter:
0.9μ; coefficient of variation of
sphere equivalent diameter: 50%; tabular
grains; diameter/thickness ratio: 1.5;
applied silver amount: 1.1)

| | |
|---|---|
| Gelatin: | 1.4 |
| ExM-4 | 0.2 |
| ExM-5 | 0.05 |
| ExM-1 | 0.01 |
| ExM-3 | 0.01 |
| ExY-1 | 0.02 |
| ExS-5 | $2.0 \times 10^{-5}$ |
| ExS-6 | $7.0 \times 10^{-5}$ |
| ExS-7 | $2.6 \times 10^{-4}$ |
| H-1 | 0.07 |
| H-2 | 0.02 |
| Solv-1 | 0.06 |
| Solv-2 | 0.4 |

Ninth Layer (High-speed green sensitive emulsion layer)

Silver bromoiodide emulsion (AgI:
10.2 mol %; inside higher AgI type; c/s
ratio: ½; sphere equivalent diameter:

-continued 1.2μ; coefficient of variation of
sphere equivalent diameter: 38%; tabular
grains; diameter/thickness ratio: 4;
applied silver amount: 2.1)

| | |
|---|---|
| Gelatin | 2.2 |
| ExC-2 | 0.02 |
| ExM-5 | 0.1 |
| ExM-1 | 0.05 |
| ExS-5 | $3.5 \times 10^{-5}$ |
| ExS-6 | $8.0 \times 10^{-5}$ |
| ExS-7 | $3.0 \times 10^{-4}$ |
| Solv-1 | 0.08 |
| Solv-2 | 0.7 |

Tenth Layer (Yellow filter layer)

| | |
|---|---|
| Yellow colloidal silver (particle size: up to 0.05μ) | 0.05 |
| Gelatin | 1.0 |
| Cpd-1 | 0.1 |

Eleventh Layer (Low-speed blue sensitive emulsion layer)

Silver bromoiodide emulsion (AgI:
9.0 mol %; inside higher AgI type; c/s
ratio: ½; sphere equivalent diameter:
0.75μ; coefficient of variation of
sphere equivalent diameter: 21%; octahedron
grains; diameter/thickness ratio: 1;
applied silver amount: 0.3)

| | |
|---|---|
| Gelatin | 1.3 |
| ExY-2 | 0.7 |
| ExY-1 | 0.03 |
| H-1 | 0.03 |
| H-2 | 0.01 |
| Solv-2 | 0.3 |

Twelfth Layer (Intermediate-speed blue sensitive emulsion layer)

Silver bromoiodide emulsion (AgI:
10.2 mol %; inside higher AgI type; c/s
ratio: ½; sphere equivalent diameter:
1.0μ; coefficient of variation of
sphere equivalent diameter: 30%; tabular
grains; diameter/thickness ratio: 3.5;
applied silver amount: 0.4)

| | |
|---|---|
| Gelatin | 0.7 |
| ExY-2 | 0.1 |
| ExS-8 | $2.2 \times 10^{-4}$ |
| H-1 | 0.01 |
| H-2 | 0.005 |
| Solv-2 | 0.05 |

Thirteenth Layer (High-speed blue sensitive emulsion layer)

Silver bromoiodide emulsion (AgI:
9.8 mol %; inside higher AgI type; c/s
ratio: ½; sphere equivalent diameter:
1.8μ; coefficient of variation of
sphere equivalent diameter: 55%; tabular
grains; diameter/thickness ratio: 4.5;
applied silver amount: 0.8)

| | |
|---|---|
| Gelatin | 0.7 |
| ExY-2 | 0.2 |
| ExS-8 | $2.3 \times 10^{-4}$ |
| Solv-2 | 0.07 |

Fourteenth Layer (first protective layer)

| | |
|---|---|
| Gelatin | 0.9 |
| UV-4 | 0.1 |
| UV-5 | 0.2 |
| H-1 | 0.02 |
| H-2 | 0.005 |
| Solv-3 | 0.03 |
| Cpd-2 | 0.7 |

Fifteenth Layer (Second protective layer)

1 g of fine particulate silver bromide emulsion having an average grain diameter of 0.07 μ and 2 g of H-1 as a hardening agent were added to the coating Liquid (H) for a surface protective layer prepared in step (2) in Example 1, and the resulting mixture was applied to form a layer so that the coating amount of the gelatin was 0.7 g/m².

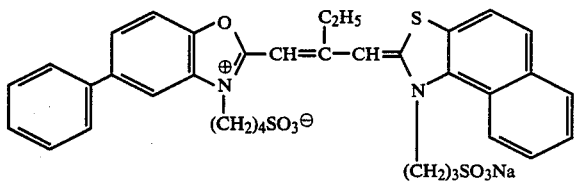
ExS-1
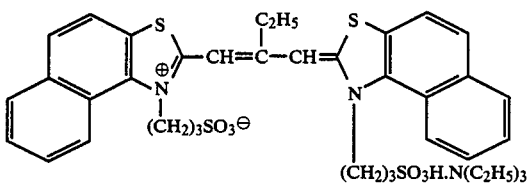
ExS-2
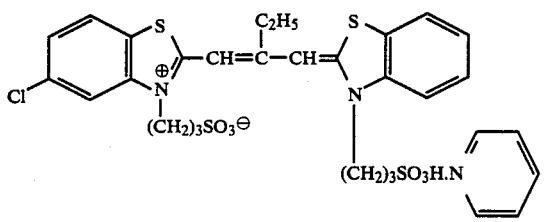
ExS-3
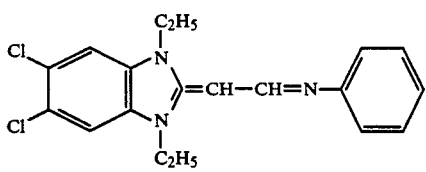
ExS-4
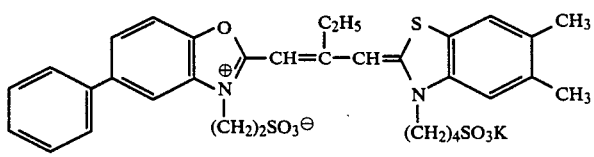
ExS-5
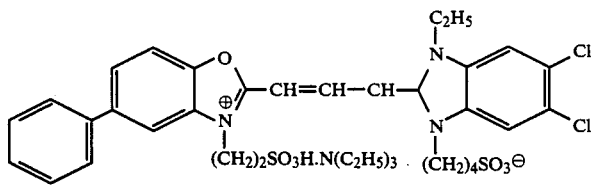
ExS-6
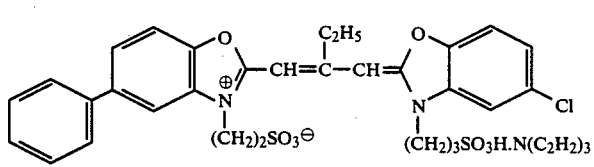
ExS-7
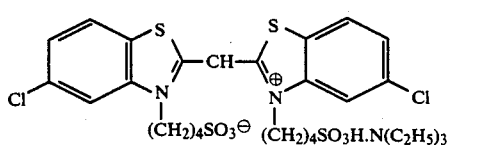
ExS-8

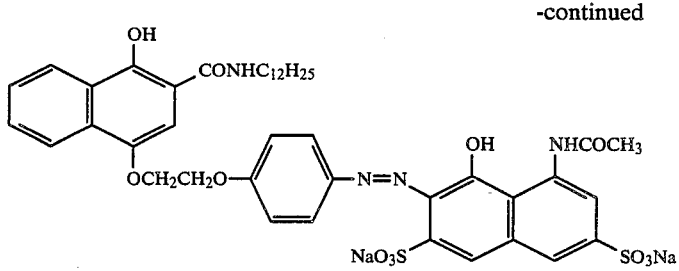
ExC-1
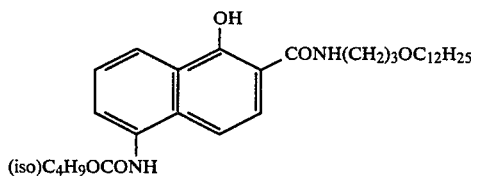
ExC-2
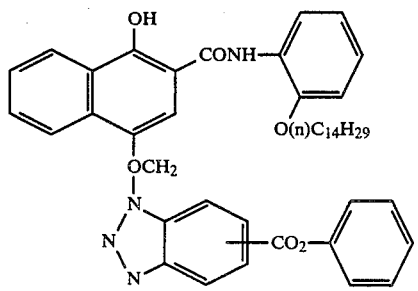
ExC-3
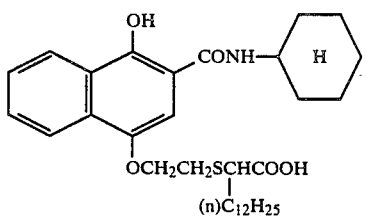
ExC-4
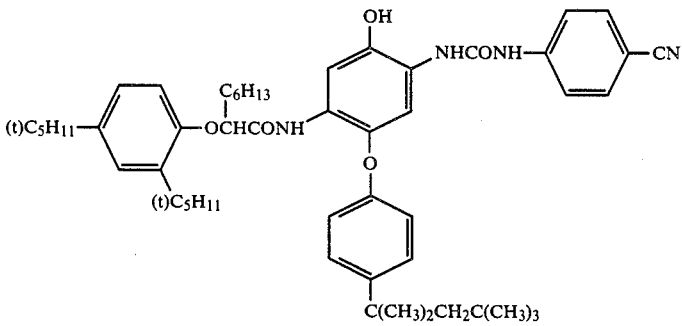
ExC-5
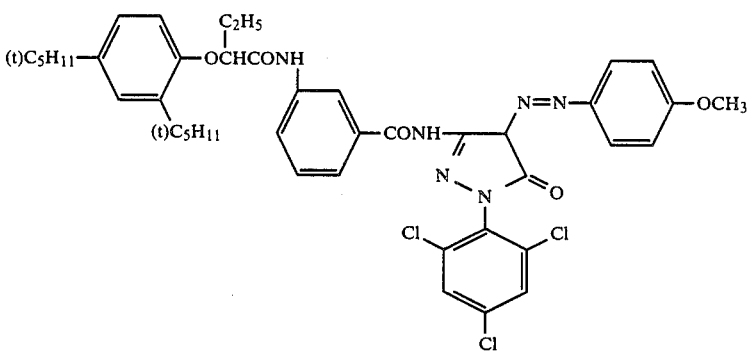
ExM-1

-continued
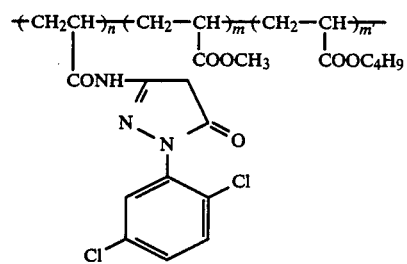 ExM-2
n/m + m' = 1
m/m' = 1
Number average molecular weight: about 40,000
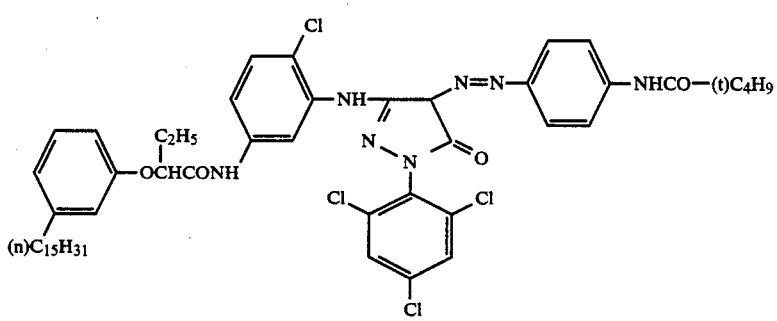 ExM-3
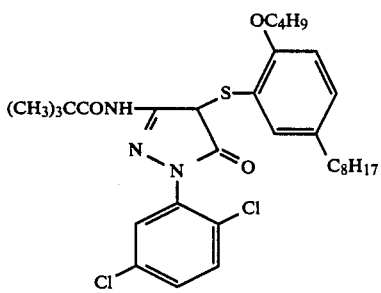 ExM-4
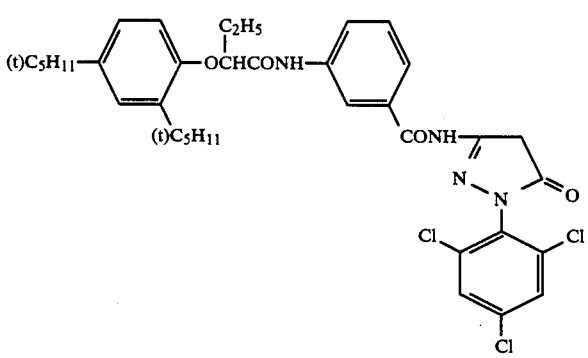 ExM-5
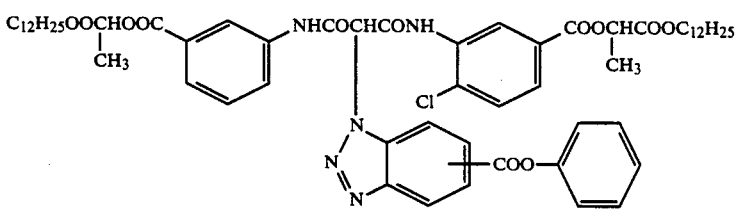 ExY-1

-continued
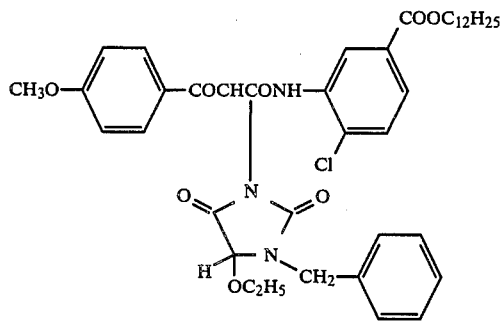 ExY-2
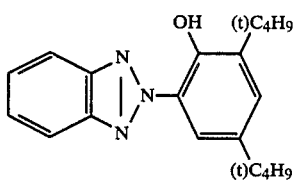 UV-1
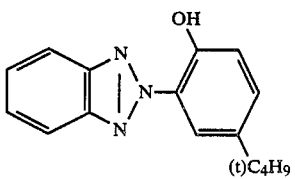 UV-2
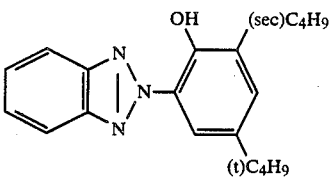 UV-3
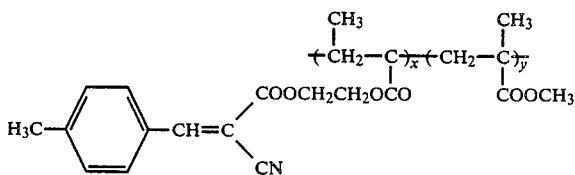 UV-4
x/y = 7/3 (wt)
Number average molecular weight: about 50,000
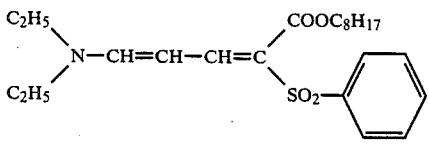 UV-5
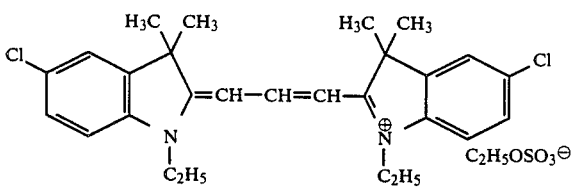 ExF-1
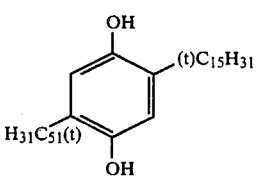 Cpd-1

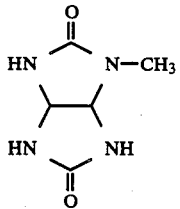

Solv-1: di-n-butylphthalate
Solv-2: tricresyl phosphate
Solv-3: trihexylphosphate

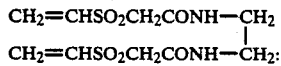

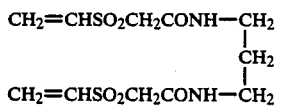

The back layers and the protective layers were combined as shown in Table 3.

(2) Assessment of Coated Samples

In the same manner as for Example 1, after keeping the samples 7 days after coating, measurement of the coefficient of friction of each sample and assessment of the winding property were done and each sample was processed in the processing method shown in Table 2 and the photographic characteristics tested.

In the same manner as for Example 1, photosensitive material package units with a lens were made. Objects, that is, a color chart and a person positioned about 3.6 m away, were photographed using a light source having a color temperature of 4800° K.

The obtained negative films were enlarged and printed on photographic paper 8×2.5×120 mm in size according to a conventional manner.

TABLE 2

| Step | Method of Processing | | |
|---|---|---|---|
| | Processing Time | Temperature | Replenishing Amount |
| Color development | 3 min 15 sec | 38° C. | 45 ml |
| Bleaching | 1 min 00 sec | 38° C. | 20 ml |
| Bleach/fix | 3 min 15 sec | 38° C. | 30 ml |
| Washing (1) | 40 sec | 35° C. | countercurrent method from (2) to (1) |
| Washing (2) | 1 min 00 sec | 35° C. | 30 ml |
| Stabilizing | 40 sec | 38° C. | 20 ml |
| Drying | 1 min 15 sec | 55° C. | |

The replenishing amount was per 1 m of length and 35 mm of width of the photographic material processed.

The composition of the processing solutions were as follows:

| Color developing solution | Mother solution (g) | Replenishing solution (g) |
|---|---|---|
| Diethylenetriaminepentaacetic acid | 1.0 | 1.1 |
| 1-Hydroxyethylidene-1,1-diphosphonic acid | 2.0 | 2.2 |
| Sodium sulfite | 4.0 | 4.9 |
| Potassium carbonate | 30.0 | 42.0 |
| Potassium bromide | 1.6 | — |
| Potassium iodide | 2.0 mg | — |
| Hydroxylamine | 2.4 | 3.6 |
| 4-(N—ethyl-N—β-hydroxyethyl-amino)-2-methylaniline sulfate | 5.0 | 7.3 |
| Water to make | 1 l | 1 l |
| pH | 10.00 | 10.00 |

Bleaching solution (mother solution was the same in composition as replenishing solution)

| | |
|---|---|
| Ammonium ethylenediaminetetraacetato ferrate | 120.0 g |
| Disodium ethylenediaminetetraacetate | 10.0 g |
| Ammonium nitrate | 10.0 g |
| Ammonium bromide | 100.0 g |
| Bleaching accelerator | $5 \times 10^{-3}$ mol |

$$\left[ \begin{array}{c} H_3C \\ H_3C \end{array} \right. \!\!\! N-(CH_2)_2-S-S-(CH_2)_2N \left. \begin{array}{c} CH_3 \\ CH_3 \end{array} \right]$$

| | |
|---|---|
| pH (by adding ammonia water) | 6.3 |
| Water to make | 1.0 l |

Bleach/fix solution (mother solution was the same in composition as replenishing solution)

| | |
|---|---|
| Ammonium ethylenediaminetetraacetato ferrate | 50.0 g |
| Disodium ethylenediaminetetraacetate | 5.0 g |
| Sodium sulfite | 12.0 g |
| Aqueous solution of ammonium thiosulfate (70%) | 240 ml |
| pH (by adding ammonia water) | 7.3 |
| Water to make | 1.0 l |

Washing water

Tap water was processed through a mixed bed type column loaded with H-type strong cation exchange resin (Diaion SK-1B manufactured by Mitsubishi Kasei KK) and OH-type strong basic anion exchange resin (Diaion SA-10A manufactured by Mitsubishi Kasei KK) to have the water quality shown below, and a bactericide, sodium dichlorinated isocyanurate was added in an amount of 20 mg/l thereto.

| | |
|---|---|
| Calcium ion | 1.1 mg/l |
| Magnesium ion | 0.5 ml/l |
| pH | 6.9 |

Stabilizing solution

| | Mother | Replenishing |

-continued

Figure 4:
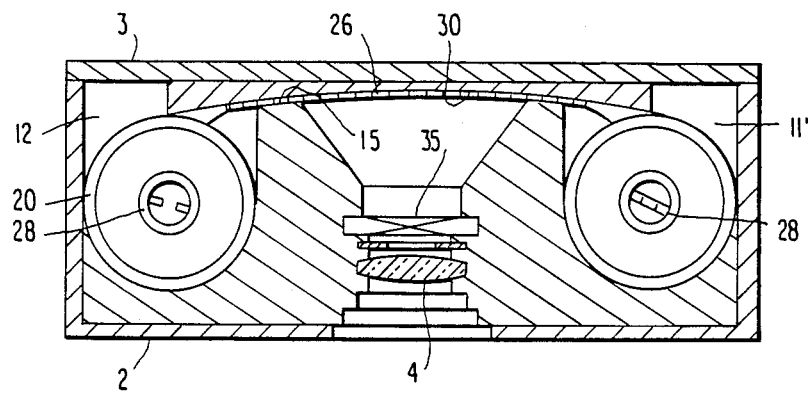
FIG. 4 is a cross sectional view of the essential parts of the photosensitive package unit loaded with a patrone according to a second embodiment of the present invention.

|  | solution (g) | solution (g) |
|---|---|---|
| Formalin (37% w/v) | 2.0 ml | 3.0 ml |
| Polyoxyethylene-p-monononyl-phenyl ether (average polymerization degree: 10) | 0.3 | 0.45 |
| Disodium ethylenediamine-tetraacetate | 0.05 | 0.07 |
| Water to make | 1 l | 1 l | a length corresponding to 24 or 36 shots was rolled in a patrone for 35 mm film and was loaded into a package unit as shown in FIG. 4, the back lid was placed in position and the thus formed units were subjected to thermal fusing under the influence of ultrasonic waves to prepare five package units for each of the photosensitive materials. In the same manner as for Example 1, after coating the units were kept for 7 days at 25° C. and at 65% relative humidity. Then after the units were then kept for 1 day at 40° C. and at 75% relative humidity, they were placed under conditions of 25° C. and at a

TABLE 3

| Sample No. | Slipping Agent in back layer | Slipping Agent in protective layer | Coefficient of friction against steel ball Back layer | Coefficient of friction against steel ball Protective layer | Coefficient of friction of back layer/ protective layer | Winding property |
|---|---|---|---|---|---|---|
| 2-1 | without | without | 0.63 | 0.50 | 0.67 | E |
| 2 | " | I-1 | " | 0.27 | 0.36 | C |
| 3 | " | II-1 | " | 0.32 | 0.37 | C |
| 4 | " | V-1 | " | 0.33 | 0.38 | C |
| 5 | Liquid J | I-1 | 0.49 | 0.28 | 0.34 | B |
| 6 | " | III-1 | " | 0.40 | 0.42 | D |
| 7 | Compound A | I-1 | 0.55 | 0.27 | 0.38 | C |
| 8 | " | III-1 | " | 0.41 | 0.43 | D |
| 9 | " | IV-1 | " | 0.35 | 0.37 | C |
| 10 | I-4 | I-1 | 0.26 | 0.26 | 0.25 | A |
| 11 | " | II-1 | " | 0.30 | 0.29 | A |
| 12 | " | IV-1*1 | " | 0.27 | 0.24 | A |
| 13 | " | V-1 | " | 0.33 | 0.30 | A |
| 14 | II-1 | I-1 | 0.33 | 0.26 | 0.27 | A |
| 15 | II-1 | I-4 | 0.33 | 0.24 | 0.25 | A |
| 16 | " | IV-1*1 | " | 0.27 | 0.26 | A |
| 17 | " | without | " | 0.50 | 0.34 | B |
| 18 | III-1 | I-1 | 0.36 | 0.26 | 0.29 | A |
| 19 | " | III-1 | " | 0.40 | 0.38 | C |
| 20 | " | IV-1 | " | 0.27 | 0.28 | A |
| 21 | IV-1hu *2 | I-1 | 0.30 | 0.27 | 0.26 | A |
| 22 | " | I-4 | " | 0.25 | 0.25 | A |
| 23 | " | IV-1*1 | " | 0.27 | 0.26 | A |
| 24 | " | without | " | 0.51 | 0.37 | C |
| 25 | liquid K | I-1 | 0.23 | 0.27 | 0.24 | A |
| 26 | " | I-4 | " | 0.27 | 0.25 | A |
| 27 | " | IV-1*1 | " | 0.28 | 0.26 | A |
| 28 | " | without | " | 0.50 | 0.33 | B |

*1 The additive given in example (1) of Japanese Patent Application (OPI) No. 90633/83 was used.
*2 $C_{18}H_{37}N(CH_2CH_2OH)_2$ was additionally used as additive.

As is apparent from Table 3, in the combinations where a suitable sliding resistance lowering means was applied to one surface and/or the other surface of a photosensitive material and the coefficient of sliding friction of the surface/undersurface was 0.35 or below, problems such as poor winding did not occur in the package unit. Further, the photographed images obtained had an image quality equal to that of the images obtained in a conventional manner, that is, by using a single lens reflex camera.

The photosensitive materials prepared in Example 2 were cut into 135 size samples. A color photographic material package unit with a lens was produced in such a manner that each roll film sample was contained in a container such as a 135 size patrone, as shown in FIG. 1. The ease of the winding was assessed.

The sample corresponding to Sample 2-1 in Table 3 showed rank D in winding property and Samples respectively corresponding to Samples 2-6 and 2-8 showed rank C, and were unsatisfactory for practical use. Samples according to the present invention where the coefficient of friction was up to 0.35 all showed rank A or B in winding property.

EXAMPLE 3

The photosensitive materials prepared in Example 2 were cut into 135 size samples. Each sample film having 65% relative humidity, and the winding property was tested under those conditions. The results are given in Table 4.

TABLE 4

| Sample No. | Winding property (number) A | B | C | D | E | Assessment |
|---|---|---|---|---|---|---|
| 2-1 |  |  | 1 | 3 | 1 | D |
| 4 |  | 2 | 3 |  |  | C |
| 6 |  |  | 3 | 2 |  | C |
| 8 |  |  | 3 | 2 |  | C |
| 10 | 5 |  |  |  |  | A |
| 14 | 5 |  |  |  |  | A |
| 18 | 5 |  |  |  |  | A |
| 24 |  | 1 | 3 | 1 |  | C |
| 28 | 4 | 1 |  |  |  | A |

While the invention has been described in detail and with reference to specific embodiments thereof, it will be apparent to one skilled in the art that various changes and modifications can be made therein without departing from the spirit and scope thereof.

What is claimed is:

1. A photosensitive material package unit provided with an exposure function, said package unit having been preloaded with a photosensitive material, which material comprises a support for a photographic layer on one side of said support and a back layer on an opposite side of the support, said photographic layer having at least one silver halide emulsion layer, said package unit comprising:
(1) a package unit main body base having (a) a first holding chamber for holding an unexposed photosensitive material with the unexposed photosensitive material rolled directly therein or with the unexposed photosensitive material rolled and contained in a container and (b) a second holding chamber for holding an exposed photosensitive material with the exposed photosensitive material rolled directly therein or with the exposed photosensitive material rolled and contained in a container, and
(2) a coefficient of friction between the photographic layer and the back layer of the photosensitive material being 0.35 or less.

2. A photosensitive material package unit as claimed in claim 1, wherein the coefficient of friction of the back layer of the photosensitive material against a steel ball is 0.35 or less.

3. A photosensitive material package unit as claimed in claim 1, wherein the coefficient of friction of the photographic layer of the photosensitive material against a steel ball is 0.35 or less.

4. A photosensitive material package unit as claimed in claim 1, wherein the second holding chamber is a support section for holding a container, and the first holding chamber directly holds a photosensitive material drawn out from said container.

5. A photosensitive material package as claimed in claim 1, wherein said coefficient of friction is between 0.10 and 0.30.

6. A photosensitive material package as claimed in claim 1, wherein at least one of the compounds represented by formulae (I), (II), (III), (IV) and (VI) is present on at least one surface of the photosensitive material, wherein formula (I) has the general structure:

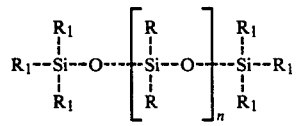

wherein
R, which may be the same or different, represents a member selected from the group consisting of an alkyl group having 5 to 20 carbon atoms, a cycloalkyl group having 5 to 20 carbon atoms, an alkoxyalkyl group having 5 to 20 carbon atoms, an arylalkyl group having 5 to 20 carbon atoms, an aryloxyalkyl group having 5 to 20 carbon atoms, and a 2,3-epoxypropyloxyalkyl group having 5 to 20 carbon atoms.
$R_1$, which may be the same or different, is selected from the group consisting of an alkyl group having 1 to 20 carbon atoms, a cycloalkyl group having 5 to 20 carbon atoms, an alkoxyalkyl group having 5 to 20 carbon atoms, an arylalkyl group having 5 to 20 carbon atoms, an aryloxyalkyl group having 5 to 20 carbon atoms, and a 2,3-epoxypropyloxyalkyl group having 5 to 20 carbon atoms, and n is an integer of 0 to 2000;
formula (II) has the general structure:

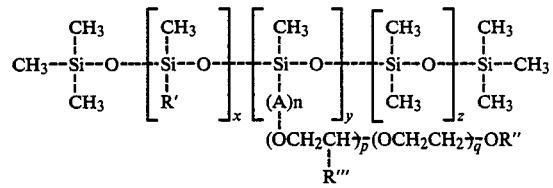

wherein
R′ is selected from the group consisting of an aliphatic group having 1 to 20 carbon atoms and an aryl group having 6 to 20 carbon atoms,
R″ is selected from the group consisting of a hydrogen atom, an aliphatic group having 1 to 20 carbon atoms, and an aryl group having 6 to 20 carbon atoms,
R‴ is selected from the group consisting of an alkyl group having 1 to 20 carbon atoms and an alkoxyalkyl group having 1 to 20 carbon atoms, A represents a divalent aliphatic hydrocarbon residue having 1 to 20 carbon atoms, n is 0 or an integer of 1 and 12, p is an integer of 0 to 5, q is an integer of 2 to 50, x is an integer of 0 to 100, y is an integer of 1 to 50, and z is an integer of 0 to 100, provided that x+y+z is an integer of 5 to 250;
Formula (III) has the general structure:

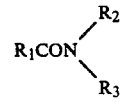

wherein
R′$_1$ represents a hydrocarbon group having at least one double bond and containing 18 to 23 carbon atoms, and $R_2$ and $R_3$ each is selected from the group consisting of a hydrogen atom and a lower alkyl group having 1 to 4 carbon atoms, wherein the hydrocarbon group represented by R′$_1$ may be straight or branched;
Formula (IV) has the general structure:

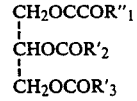

wherein
R″$_1$, R′$_2$ and R′$_3$, which may be the same or different, each represents an alkyl group having 10 to 20 carbon atoms;
Formula (V) has the general structure:

wherein
$R_4$ and $R_5$, which may be the same or different, each represents an alkyl group having 10 to 20 carbon atoms;
Formula (VI) has the general structure:

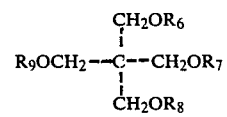

wherein
$R_6$, $R_7$, $R_8$ and $R_9$ each is selected from the group consisting of a hydrogen atom and an aliphatic carboxylic acid residue having 12 to 24 carbon atoms, and at least three of $R_6$, $R_7$, $R_8$ and $R_9$ represent aliphatic carboxylic acid residues having 12 to 24 carbon atoms.

* * * * *